US009043567B1

(12) United States Patent
Modukuri et al.

(10) Patent No.: US 9,043,567 B1
(45) Date of Patent: May 26, 2015

(54) METHODS AND SYSTEMS FOR REPLICATING AN EXPANDABLE STORAGE VOLUME

(75) Inventors: Kiran K. Modukuri, Sunnyvale, CA (US); Logan R. Jennings, Menlo Park, CA (US)

(73) Assignee: NETAPP, INC., Sunnyvale, CA (US)

( * ) Notice: Subject to any disclaimer, the term of this patent is extended or adjusted under 35 U.S.C. 154(b) by 372 days.

(21) Appl. No.: 13/433,170

(22) Filed: Mar. 28, 2012

(51) Int. Cl.
*G06F 13/00* (2006.01)
*G06F 12/10* (2006.01)
*G06F 3/06* (2006.01)
*G06F 12/02* (2006.01)
*G06F 17/30* (2006.01)
*G06F 11/20* (2006.01)
*G06F 12/16* (2006.01)
*G06F 12/00* (2006.01)
*G06F 11/14* (2006.01)

(52) U.S. Cl.
CPC .......... *G06F 12/1009* (2013.01); *G06F 3/0607* (2013.01); *G06F 3/0662* (2013.01); *G06F 3/0665* (2013.01); *G06F 3/067* (2013.01); *G06F 3/0631* (2013.01); *G06F 12/0292* (2013.01); *G06F 17/30* (2013.01); *G06F 13/00* (2013.01); *G06F 11/2071* (2013.01); *G06F 11/2082* (2013.01); *G06F 12/16* (2013.01); *G06F 12/00* (2013.01); *G06F 11/2074* (2013.01); *G06F 11/1451* (2013.01)

(58) Field of Classification Search
CPC ............ G06F 11/1451; G06F 11/2064; G06F 11/2082; G06F 12/08; G06F 12/122; G06F 12/12; G06F 17/30215; G06F 17/30578; G06F 2201/84
See application file for complete search history.

(56) References Cited

U.S. PATENT DOCUMENTS

| 6,173,293 | B1 | 1/2001 | Thekkath et al. | |
|---|---|---|---|---|
| 7,523,276 | B1* | 4/2009 | Shankar | 711/162 |
| 8,204,860 | B1* | 6/2012 | Ferguson et al. | 707/639 |
| 8,352,785 | B1 | 1/2013 | Nicklin et al. | |
| 8,484,259 | B1* | 7/2013 | Makkar et al. | 707/827 |
| 2009/0106255 | A1* | 4/2009 | Lacapra et al. | 707/10 |

(Continued)

OTHER PUBLICATIONS

Non-Final Office Action on co-pending U.S. Appl. No. 13/433,157 dated Jul. 31, 2014.

(Continued)

*Primary Examiner* — Jared Rutz
*Assistant Examiner* — Jean Edouard
(74) *Attorney, Agent, or Firm* — Klein, O'Neill & Singh, LLP

(57) ABSTRACT

Machine implemented method and system for generating a disaster recovery copy of an expandable storage volume having a namespace for storing information for accessing data objects stored at a data constituent volume is provided. A transfer operation for transferring a point in time copy of the expandable storage volume from a first location to a second location is generated. Information regarding the expandable storage volume from the first location is retrieved and a destination expandable storage volume is resized to match components of the expandable storage volume at the first location. Thereafter, the point in time copy of the expandable storage volume is transferred from the first location to the second location and configuration information regarding the point in time copy is copied from the first location to the second location.

20 Claims, 20 Drawing Sheets

(56) References Cited

U.S. PATENT DOCUMENTS

2010/0077160 A1* 3/2010 Liu et al. ............... 711/162
2012/0173822 A1   7/2012 Testardi et al.
2012/0179650 A1   7/2012 Vechev et al.

OTHER PUBLICATIONS

Notice of Allowance on co-pending U.S. Appl. No. 13/433,157 dated Feb. 4, 2015.

* cited by examiner

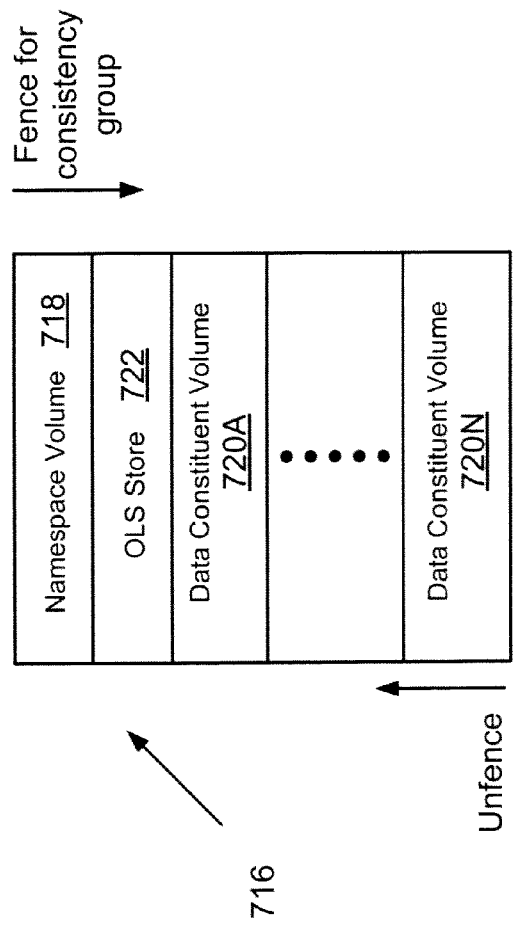

| V Server Identifier 710A | InfiniteVol Identifier 710B | Snapshot Name 710C | Overall Snapshot Id 710D | Snapshot Identifier for each volume 710E | Volume Identifier 710F | Time Stamp 710G |
|---|---|---|---|---|---|---|
| | | | | | | |

METHODS AND SYSTEMS FOR REPLICATING AN EXPANDABLE STORAGE VOLUME

CROSS REFERENCE TO RELATED APPLICATION

This patent application is related to U.S. patent application Ser. No. 13/433,157, entitled "METHODS AND SYSTEMS FOR REPLICATING AN EXPANDABLE STORAGE VOLUME", filed on even date herewith, the disclosure of which is incorporated herein by its entirety.

TECHNICAL FIELD

At least one embodiment of the present invention pertains to storage systems, and more particularly, to methods and systems using a unified namespace to access data objects in a storage system.

BACKGROUND

Network based storage, or simply "network storage", is a common approach to backing up data, making large amounts of data accessible to multiple users, and other purposes. In a network storage environment, a storage server (or storage system) makes data available to client (also referred to as "host") systems by presenting or exporting to clients one or more logical data containers. There are various forms of network storage, including network attached storage (NAS) and storage area network (SAN). In a NAS context, a storage server services file-level requests from clients, whereas in a SAN context a storage server services block-level requests. Some storage servers are capable of servicing both file-level requests and block-level requests.

There are several trends that are relevant to network storage technology, The first is that the amount of data being stored within a typical enterprise is increasing from year to year. Second, there are now multiple mechanisms (or protocols) by which a user may wish to access data stored in network storage system. For example, consider a case where a user wishes to access a document stored at a particular location in a network storage system. The user may use a network file system (NFS) protocol to access the document over a local area network in a manner similar to how local storage is accessed. The user may also use an HTTP protocol to access a document over a wide area network such as an Internet network. Traditional storage systems use a different storage mechanism (e.g., a different file system) for presenting data over each such protocol. Accordingly, traditional network storage systems do not allow the same stored data to be accessed concurrently over multiple different protocols at the same level of a protocol stack.

In addition, network storage systems presently are constrained in the way they allow a user to store or navigate data. Consider, for example, a photo that is stored under a given path name, such as "/home/eng/myname/office.jpeg". In a traditional network storage system, this path name maps to a specific volume and a specific file location (e.g., an inode number). Thus, a path name of a file (e.g., a photo) is closely tied to the file's storage location. In other words, the physical storage location of the file is determined by the path name of the file. Accordingly, in traditional storage systems, the path name of the file needs to be updated every time the physical storage location of the file changes (e.g., when the file is transferred to a different storage volume). This characteristic significantly limits the flexibility of the system.

Continuous efforts are being made to provide a flexible, expandable storage system, where data objects may be stored across storage volumes managed by different storage system nodes.

SUMMARY

In one embodiment, a machine implemented method and system for generating a disaster recovery copy of an expandable storage volume having a namespace for storing information for accessing data objects stored at a data constituent volume is provided. A transfer operation for transferring a point in time copy of the expandable storage volume from a first location to a second location is generated. Information regarding the expandable storage volume from the first location is retrieved and a destination expandable storage volume is resized to match components of the expandable storage volume at the first location. Thereafter, the point in time copy of the expandable storage volume from the first location to the second location is transferred and configuration information regarding the point in time copy is copied from the first location to the second location; and a data structure for storing information regarding the transferred point in time copy of the expandable storage volume is updated.

In another embodiment, a machine implemented method for generating a disaster recovery copy of an expandable storage volume having a namespace for storing information for accessing data objects stored at a data constituent volume is provided. The method includes generating a transfer operation for transferring a snapshot of the expandable storage volume from a first location to a second location; retrieving information regarding the expandable storage volume from the first location; resizing a destination expandable storage volume at the second location to match components of the expandable storage volume at the first location; transferring the snapshot of the expandable storage volume from the first location to the second location; copying configuration information regarding the snapshot from the first location to the second location; and updating a data structure for storing information regarding the transferred snapshot of the expandable storage volume.

In yet another embodiment, a system for generating a disaster recovery copy of an expandable storage volume having a namespace for storing information for accessing data objects stored at a data constituent volume. The system includes a first storage system at a first location for managing the expandable storage volume; a second storage system at a second location for managing a destination expandable storage volume; a processor executable replication application configured to generate a transfer operation for transferring a snapshot of the expandable storage volume from the first location to the second location; retrieve information regarding the expandable storage volume from the first location; and resize the destination expandable storage volume at the second location to match components of the expandable storage volume at the first location; wherein the snapshot of the expandable storage volume is transferred from the first location to the second location with configuration information regarding the snapshot.

In another embodiment, a machine implemented method for managing a disaster recovery copy of an expandable storage volume at a first location having a namespace for storing information for accessing data objects stored at a data constituent volume is provided. The method includes resizing a destination expandable storage volume at a second location to match components of the expandable storage volume at the first location; transferring a snapshot of the expandable storage volume from the first location to the second location to be stored as the disaster recovery copy; presenting the disaster recovery copy to a computing system for reading and writing information at the second location; resizing the expandable storage volume at the first location to match the destination expandable storage volume at the second location; and re-synchronizing the expandable storage volume with the destination storage volume after the first location becomes available.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIG. 7B shows a volume data structure used according to one embodiment.

FIG. 7C shows an example of using a consistency group for replicating a storage volume, according to one embodiment.

FIG. 7D shows a snapshot data structure for replicating an expandable storage volume, according to one embodiment.

DETAILED DESCRIPTION

As a preliminary note, the terms "component", "module", "system," and the like as used in this disclosure are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, flash memory device or any other non-volatile memory device, or any other storage device, in accordance with the claimed subject matter.

In one embodiment, a machine implemented method and system for generating a disaster recovery copy of an expandable storage volume having a namespace for storing information for accessing data objects stored at a data constituent volume is provided. A transfer operation for transferring a point in time copy of the expandable storage volume from a first location to a second location is generated. Information regarding the expandable storage volume from the first location is retrieved and a destination expandable storage volume is resized to match components of the expandable storage volume at the first location. Thereafter, the point in time copy of the expandable storage volume from the first location to the second location is transferred and configuration information regarding the point in time copy is copied from the first location to the second location; a data structure for storing information regarding the transferred point in time copy of the expandable storage volume is updated.

Figure 1:
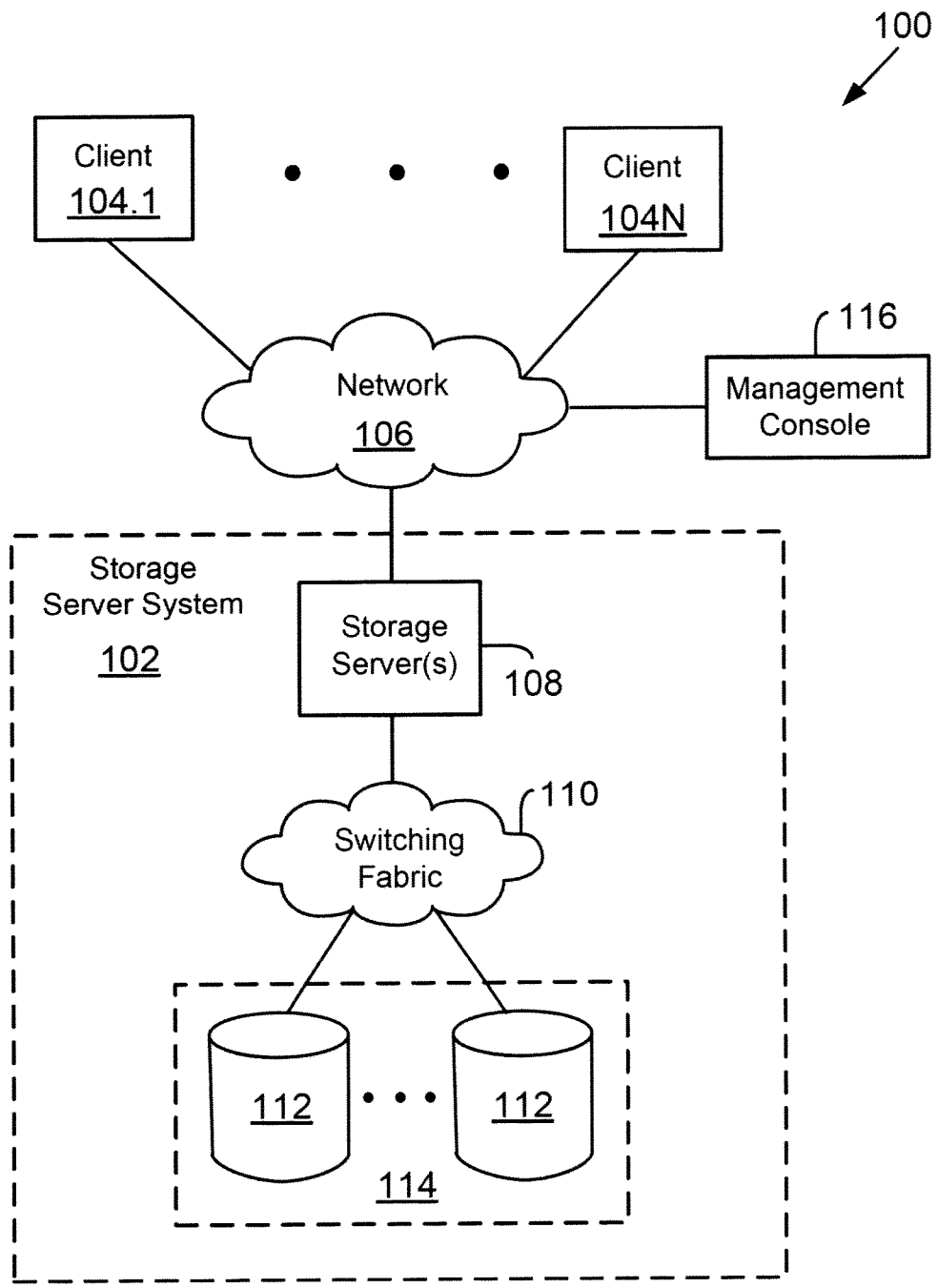
FIG. 1 illustrates a network storage environment, according to one embodiment.
Figure 2:
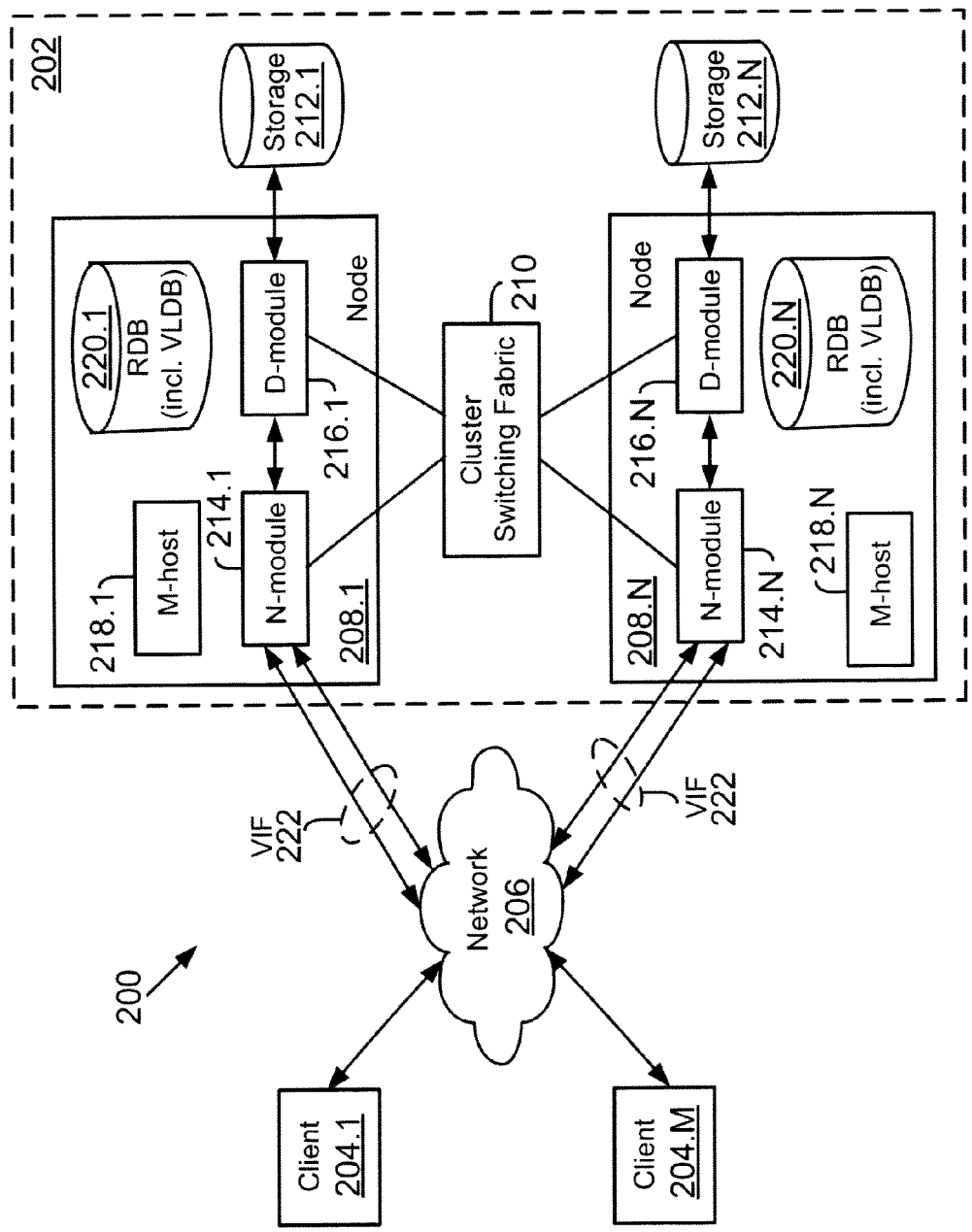
FIG. 2 illustrates a clustered network storage environment, according to one embodiment.

System Environment:

FIGS. 1 and 2 show, at different levels of detail, storage environment configurations in which the techniques introduced here can be implemented. Clients are presented with an expandable volume having a plurality of storage volumes that can be managed by a plurality of nodes. The expandable storage volume is replicated, for example, by taking snapshots of each storage volume at a primary location. The techniques described below in detail provide a disaster recovery solution based on which the snapshots at the primary location are copied to a remote location. The remote location can be used if the primary location becomes unavailable for any reason. The snapshots at the remote location can be presented to clients as a single logical object and clients are able to access snapshots of various volumes using the single logical object, as described below in detail.

Referring to FIG. 1, a network data storage environment 100 is shown. The storage environment 100 includes a plurality of client systems 104.1-104.N, a storage server system 102, and a network 106 connecting the client systems 104.1-104.N and the storage server system 102. As shown in FIG. 1, the storage server system 102 includes at least one storage server 108, a switching fabric 110, and a number of mass storage devices 112 within a mass storage subsystem 114, such as conventional magnetic disks, optical disks such as CD-ROM or DVD based storage, magneto-optical (MO) storage, flash memory storage device or any other type of non-volatile storage devices suitable for storing structured or unstructured data. The examples disclosed herein may reference a storage device as a "disk" but the adaptive embodiments disclosed herein are not limited to disks or any particular type of storage media/device, in the mass storage subsystem 114.

The storage server (or servers) 108 may be, for example, one of the storage server products available from NetApp, Inc., the assignee of the present application. The client systems 104.1-104.N may access the storage server 108 via network 106, which can be a packet-switched network, for example, a local area network (LAN), wide area network (WAN) or any other type of network.

The storage server 108 maybe connected to the storage devices 112 via the switching fabric 110, which can be a fiber distributed data interface (FDDI) network, for example. It is noted that, within the network data storage environment, any other suitable numbers of storage servers and/or mass storage devices, and/or any other suitable network technologies, may be employed. While FIG. 1 implies, in some embodiments, a fully connected switching fabric 110 where storage servers can see all storage devices, it is understood that such a connected topology is not required. In some embodiments, the storage devices can be directly connected to the storage servers such that no two storage servers see a given storage device.

The storage server 108 can make some or all of the storage space on the storage devices 112 available to the client systems 104.1-104.N in a conventional manner. For example, each storage device 112 can be implemented as an individual disk, multiple disks (e.g., a RAID group) or any other suitable mass storage device(s). The storage server 108 can communicate with the client systems 104.1-104.N according to well-known protocols, such as the Network File System (NFS) protocol or the Common Internet File System (CIFS) protocol, to make data stored at storage devices 112 available to users and/or application programs.

The storage server 108 can present or export data stored at storage device 112 as volumes (also referred to herein as storage volumes) to each of the client systems 104.1-104.N. A "volume" is an abstraction of physical storage, combining one or more physical mass storage devices (e.g., disks) or parts thereof into a single logical storage object (the volume), and which is managed as a single administrative unit, such as a single file system. A "file system" is a structured (e.g., hierarchical) set of stored logical containers of data (e.g., volumes, logical unit numbers (LUNs), directories, files). Note that a "file system" does not have to include or be based on "files" per se as its units of data storage.

Various functions and configuration settings of the storage server 108 and the mass storage subsystem 114 can be controlled from a management console 116 coupled to the network 106.

FIG. 2 depicts a cluster based storage environment 200 having a plurality of server nodes, according to one embodiment. In the cluster based storage environment 200, clients may be presented with an expandable storage volume (for example, an Infinite volume 600 described below with respect to FIG. 6) having a plurality of storage volumes that are managed by different server nodes. The various storage volumes are replicated using the techniques described below in detail.

The storage environment 200 includes a plurality of client systems 204 (204.1-204.M), a clustered storage system 202, and a network 206 connecting the client systems 204 and the clustered storage server system 202. As shown in FIG. 2, the clustered storage server system 202 includes a plurality of server nodes (may also be referred to as "nodes") 208.1-208.N (208), a cluster switching fabric 210, and a plurality of mass storage devices 212 (212.1-212.N), similar to storage devices 112 (FIG. 1). Note that more than one mass storage device 212 can be associated with each node 208.

Each of the nodes 208 is configured to include several modules, including an N-module 214, a D-module 216, and an M-host 218 (each of which can be implemented by using a separate processor executable module) and an instance of a replicated database (RDB) 220. Specifically, node 208.1 includes an N-module 214.1, a D-module 216.1, and an M-host 218.1; node 208.N includes an N-module 214.N, a D-module 216.N, and an M-host 218.N; and so forth. The N-modules 214.1-214.N include functionality that enables nodes 208.1-208.N, respectively, to connect to one or more of the client systems 204 over the network 206, while the D-modules 216.1-216.N provide access to the data stored at storage devices 212.1-212.N, respectively. The M-hosts 218 provide management functions for the clustered storage server system 202 including a system for replicating the Infinite Volume 600 described below in detail. Accordingly, each of the server nodes 208 in the clustered storage server arrangement provides the functionality of a storage server.

In one embodiment RDB 220 is a database that is replicated throughout the cluster, i.e., each node 208 includes an instance of the RDB 220. The various instances of the RDB 220 are updated regularly to bring them into synchronization with each other. The RDB 220 provides cluster-wide storage for information used by nodes 208, including a volume location database (VLDB) (not shown). The VLDB is a database that indicates the location within the cluster of each volume in the cluster (i.e., the owning D-module 216 for each volume) and is used by the N-modules 214 to identify the appropriate D-module 216 for any given volume to which access is requested.

A switched virtualization layer including a plurality of virtual interfaces (VIFs) 222 is provided between the respective N-modules 214.1-214.N and the client systems 204.1-204.M, allowing the storage 212.1-212.N associated with the nodes 208.1-208.N to be presented to the client systems as a single shared storage pool.

The clustered storage system 202 can be organized into any suitable number of virtual servers (also referred to as "vservers"), in which each vserver represents a single storage system namespace with separate network access. Each vserver has a user domain and a security domain that are separate from the user and security domains of other vservers. Moreover, each vserver is associated with one or more VIFs 222 and can span one or more physical nodes, each of which can hold one or more VIFs 222 and storage associated with one or more vservers. Client systems can access the data on a vserver from any node of the clustered system, but only through the VIFs 222 associated with that vserver. It is noteworthy that the embodiments described herein are not limited to the use of vservers.

The nodes 208 are interconnected by a cluster switching fabric 210, which can be embodied as a Gigabit Ethernet switch, for example. The N-modules 214 and D-modules 216 cooperate to provide highly-scalable, distributed storage system architecture of a clustered computing environment implementing exemplary embodiments of the present invention. Note that while there is shown an equal number of N-modules and D-modules in FIG. 2, there may be differing numbers of N-modules and/or D-modules in accordance with various embodiments of the technique described here. For example, there need not be a one-to-one correspondence between the N-modules and D-modules. As such, the description of a node 208 comprising one N-module and one D-module should be understood to be illustrative only.

Figure 3:
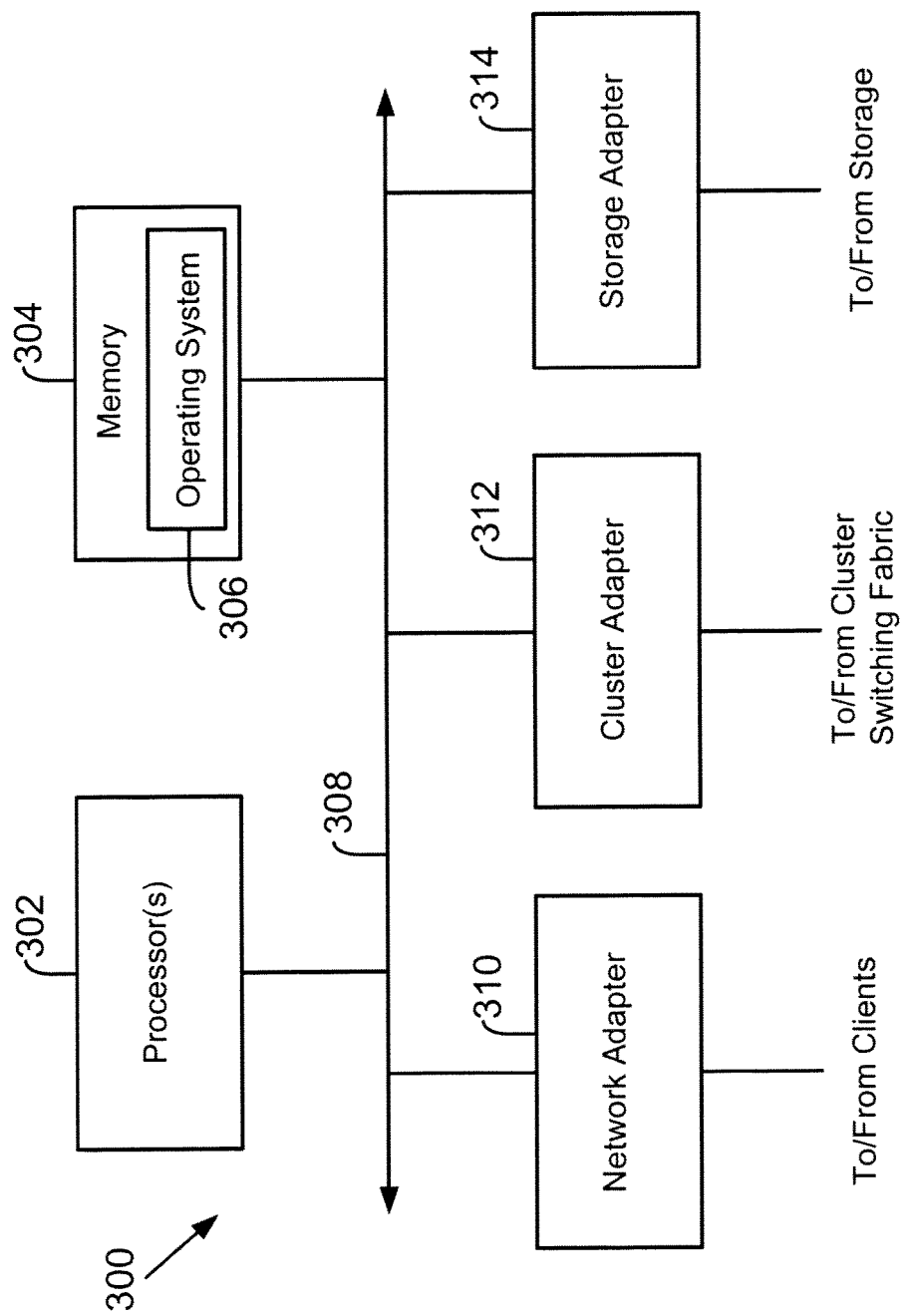
FIG. 3 is a high-level block diagram showing an example of the hardware architecture of a storage controller that can implement one or more storage server nodes, according to one embodiment.

FIG. 3 is a diagram illustrating an example for implementing one or more of the storage server nodes 208 as a storage controller 300. The storage controller 300 executes some or all of the processor executable process steps that are described below in detail. In one embodiment, the storage controller 300 includes a processor subsystem that includes one or more processors 302. Processor 302 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The storage controller 300 further includes a memory 304, a network adapter 310, a cluster access adapter 312 and a storage adapter 314, all interconnected by an interconnect 308. Interconnect 308 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other system.

The cluster access adapter 312 includes a plurality of ports adapted to couple the node 208 to other nodes 208 of the cluster. In the illustrated embodiment, Ethernet is used as the clustering protocol and interconnect media, although other types of protocols and interconnects may be utilized within the cluster architecture described herein. In alternative embodiments where the N-modules and D-modules are implemented on separate storage systems or computers, the cluster access adapter 312 is utilized by the N-module 214 and/or D-module 216 for communicating with other N-modules and/or D-modules of the cluster.

The storage controller 300 can be embodied as a single- or multi-processor storage system executing a storage operating system 306 that preferably implements a high-level module, such as a storage manager, to logically organize the information as a hierarchical structure of named directories, files and special types of files called virtual disks (hereinafter generally "blocks") at the storage devices. Illustratively, one processor 302 can execute the functions of the N-module 214 on the node 208 while another processor 302 executes the functions of the D-module 216.

The memory 304 illustratively comprises storage locations that are addressable by the processors and adapters 310, 312, 314 for storing processor executable code and data structures associated with the present disclosure. The processor 302 and adapters may, in turn, comprise processing elements and/or logic circuitry configured to execute the software code and manipulate the data structures. The storage operating system 306, portions of which is typically resident in memory and executed by the processors(s) 302, functionally organizes the storage controller 300 by (among other things) configuring the processor(s) 302 to invoke storage operations in support of the storage service provided by the node 208. It will be apparent to those skilled in the art that other processing and memory implementations, including various computer readable storage media, may be used for storing and executing program instructions pertaining to the technique introduced here.

The network adapter 310 includes a plurality of ports to couple the storage controller 300 to one or more clients 204 over point-to-point links, wide area networks, virtual private networks implemented over a public network (Internet) or a shared local area network. The network adapter 310 thus can include the mechanical, electrical and signaling circuitry needed to connect the storage controller 300 to the network 206. Illustratively, the network 206 can be embodied as an Ethernet network or a Fibre Channel (FC) network. Each client 204 can communicate with the node 208 over the network 206 by exchanging discrete frames or packets of data according to pre-defined protocols, such as TCP/IP.

The storage adapter 314 cooperates with the storage operating system 306 to access information requested by the clients 204. The information may be stored on any type of attached array of writable storage media, such as magnetic disk or tape, optical disk (e.g., CD-ROM or DVD), flash memory, solid-state disk (SSD), electronic random access memory (RAM), micro-electro mechanical and/or any other similar media adapted to store information, including data and parity information. However, as illustratively described herein, the information is stored on storage devices 212. The storage adapter 314 includes a plurality of ports having input/output (I/O) interface circuitry that couples to the disks over an I/O interconnect arrangement, such as a conventional high-performance, Fibre Channel (FC) link topology.

Storage of information on storage devices 212 can be implemented as one or more storage volumes that include a collection of physical storage disks cooperating to define an overall logical arrangement of volume block number (VBN) space on the volume(s). The storage devices 212 can be organized as a RAID group. One or more RAID groups together form an aggregate. An aggregate can contain one or more volumes/file systems.

The storage operating system 306 facilitates clients' access to data stored on the storage devices 212. In certain embodiments, the storage operating system 306 implements a write-anywhere file system that cooperates with one or more virtualization modules to "virtualize" the storage space provided by storage devices 212. In certain embodiments, a storage manager 406 (FIG. 4) logically organizes the information as a hierarchical structure of named directories and files on the storage devices 212. Each "on-disk" file may be implemented as set of disk blocks configured to store information, such as data, whereas the directory may be implemented as a specially formatted file in which names and links to other files and directories are stored. The virtualization module(s) allow the storage manager 406 to further logically organize information as a hierarchical structure of blocks on the disks that are exported as named logical unit numbers (LUNs).

In the illustrative embodiment, the storage operating system 306 is a version of the Data ONTAP® operating system available from NetApp, Inc. and the storage manager 406 implements the Write Anywhere File Layout (WAFL®) file system. However, other storage operating systems are capable of being enhanced or created for use in accordance with the principles described herein.

Figure 4:
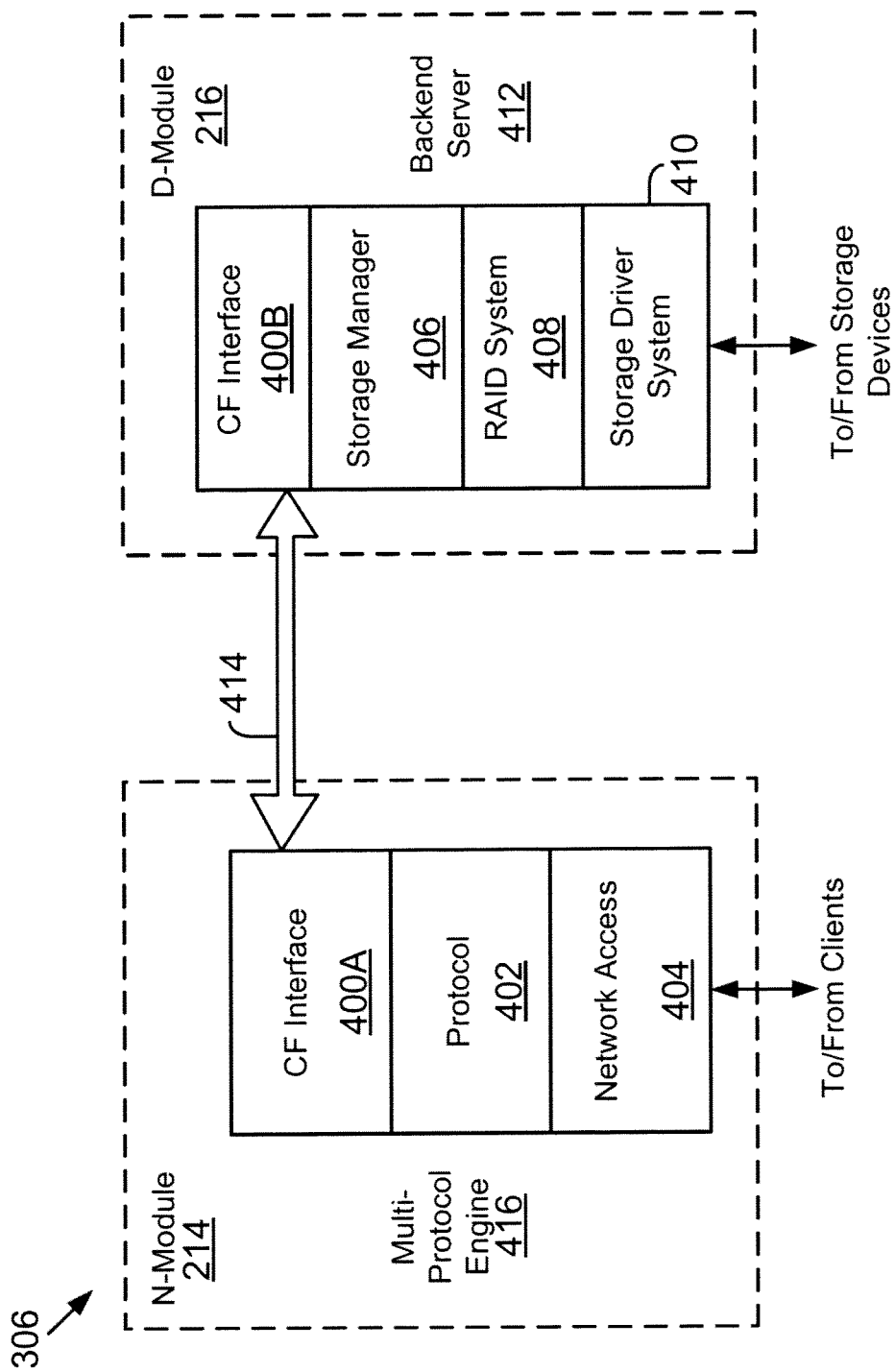
FIG. 4 illustrates an example of a storage operating system of a storage server node, used according to one embodiment.

FIG. 4 is a diagram illustrating an example of storage operating system 306 that can be used with the replication techniques introduced here. The storage operating system 306 may be used to maintain various data structures for replicating storage volumes and providing access to replicated storage volumes, as described below in more detail.

In the illustrated embodiment the storage operating system 306 includes multiple functional layers organized to form an integrated network protocol stack or, more generally, a multiprotocol engine 416 that provides data paths for clients to access information stored on the node using block and file access protocols. The multiprotocol engine 416 in combination with underlying processing hardware also forms the N-module 214. The multi-protocol engine 416 includes a network access layer 404 which includes one or more network drivers that implement one or more lower-level protocols to enable the processing system to communicate over the network 206, such as Ethernet, Internet Protocol (IP), Transport Control Protocol/Internet Protocol (TCP/IP), Fibre Channel Protocol (FCP) and/or User Datagram Protocol/Internet Protocol (UDP/IP). The multiprotocol engine 416 also includes a protocol layer 402 which implements various higher-level network protocols, such as NFS, CIFS, Hypertext Transfer Protocol (HTTP), Internet small computer system interface (iSCSI), etc. Further, the multiprotocol engine 416 includes a cluster fabric (CF) interface module 400A which implements intra-cluster communication with D-modules and with other N-modules.

In addition, the storage operating system 306 includes a set of layers organized to form a backend server 412 that provides data paths for accessing information stored on the storage devices 212 of the node 208. The backend server 412 in combination with underlying processing hardware also forms the D-module 216. To that end, the backend server 412 includes a storage manager module 406 that manages any number of storage volumes, a RAID system module 408 and a storage driver system module 410.

The storage manager 406 primarily manages a file system (or multiple file systems) and serves client-initiated read and write requests. The RAID system 408 manages the storage and retrieval of information to and from the volumes/disks in accordance with a RAID redundancy protocol, such as RAID-4, RAID-5, or RAID-DP, while the storage driver system 410 implements a disk access protocol such as SCSI protocol or FCP.

The backend server 412 also includes a CF interface module 400B to implement intra-cluster communication 414 with N-modules and/or other D-modules. The CF interface modules 400A and 400B can cooperate to provide a single file system image across the D-modules 216 in the cluster. Thus, any network port of an N-module 214 that receives a client request can access any data container within the single file system image located on any D-module 216 of the cluster.

The CF interface modules 400A/400B implement the CF protocol to communicate file system commands among the modules of cluster over the cluster switching fabric 210 (FIG. 2). Such communication can be effected by a D-module exposing a CF application programming interface (API) to which an N-module (or another D-module) issues calls. To that end, a CF interface module can be organized as a CF encoder/decoder. The CF encoder of, e.g., CF interface 400A on N-module 214 can encapsulate a CF message as (i) a local procedure call (LPC) when communicating a file system command to a D-module 216 residing on the same node or (ii) a remote procedure call (RPC) when communicating the command to a D-module residing on a remote node of the cluster. In either case, the CF decoder of CF interface 400B on D-module 216 de-encapsulates the CF message and processes the file system command.

In operation of a node 208, a request from a client 204 is forwarded as a packet over the network 206 and onto the node 208, where it is received at the network adapter 310 (FIG. 3). A network driver of layer 404 processes the packet and, if appropriate, passes it on to a network protocol and file access layer for additional processing prior to forwarding to the storage manager 406. At that point, the storage manager 406 generates operations to load (retrieve) the requested data from storage device 212 if it is not resident in memory 304. If the information is not in memory 304, the storage manager 406 indexes into a metadata file to access an appropriate entry and retrieve a logical virtual block number (VBN). The storage manager 406 then passes a message structure including the logical VBN to the RAID system 408; the logical VBN is mapped to a disk identifier and disk block number (DBN) and sent to an appropriate driver (e.g., SCSI) of the storage driver system 410. The storage driver accesses the DBN from the specified storage device 212 and loads the requested data block(s) in memory for processing by the node. Upon completion of the request, the node (and operating system) returns a reply to the client 204 over the network 206.

The data request/response "path" through the storage operating system 306 as described above can be implemented in general-purpose programmable hardware executing the storage operating system 306 as software or firmware. Alternatively, it can be implemented at least partially in specially designed hardware. That is, in an alternate embodiment of the invention, some or all of the storage operating system 306 is implemented as logic circuitry embodied within a field programmable gate array (FPGA) or an application specific integrated circuit (ASIC), for example.

The N-module 214 and D-module 216 each can be implemented as processing hardware configured by separately-scheduled processes of storage operating system 306; however, in an alternate embodiment, the modules may be implemented as processing hardware configured by code within a single operating system process. Communication between an N-module 214 and a D-module 216 is thus illustratively effected through the use of message passing between the modules although, in the case of remote communication between an N-module and D-module of different nodes, such message passing occurs over the cluster switching fabric 210. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF API.

Figure 5A:
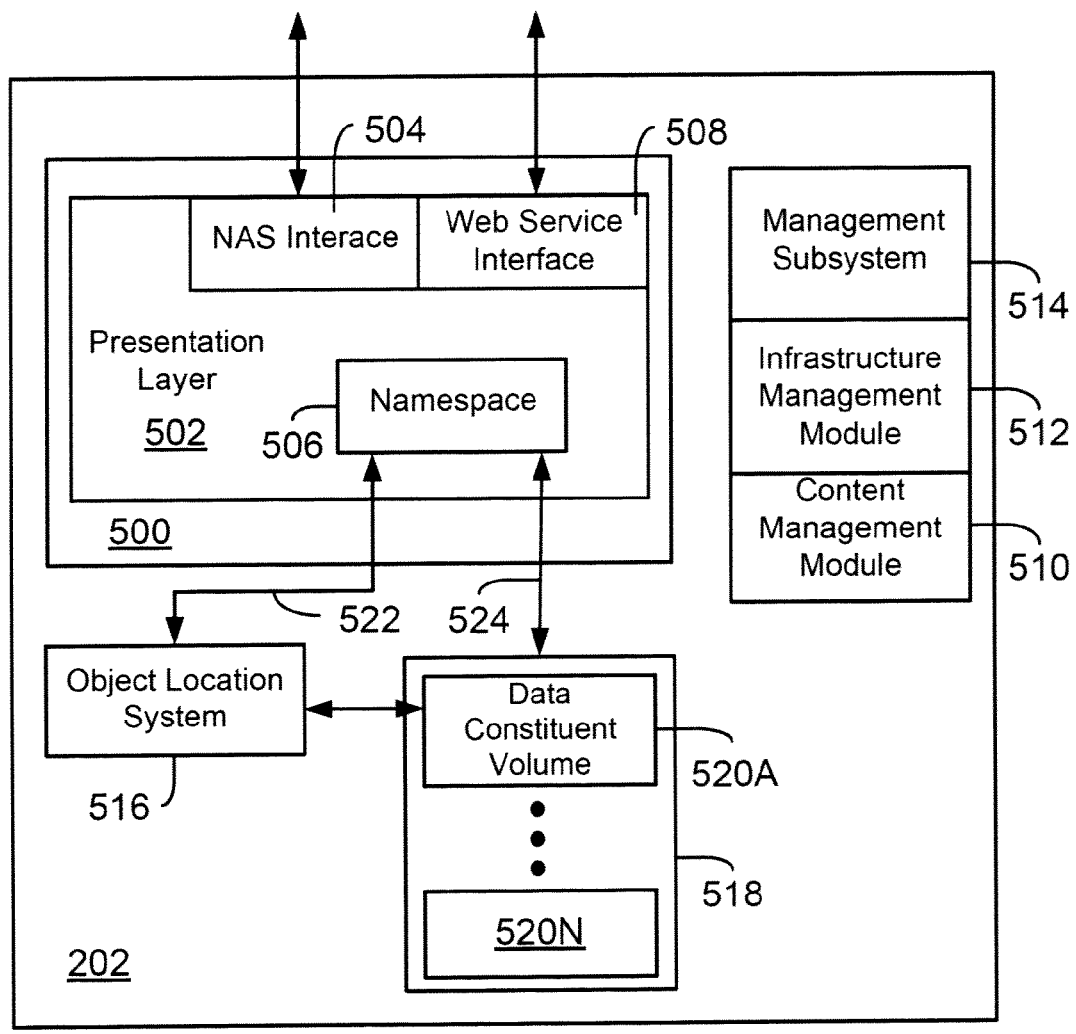
FIG. 5A illustrates the overall architecture of a content repository according to one embodiment.

Overview of Content Repository:

The techniques introduced here generally relate to a content repository implemented in a network storage server system 202 such as described above. FIG. 5A illustrates the overall architecture of the content repository according to one embodiment. The content repository includes a distributed object store 518, an object location subsystem (OLS) 516, a presentation layer 502, and a management subsystem 514. Normally there will be a single instance of each of these components in the overall content repository, and each of these components can be implemented in any one server node 208 or distributed across two or more server nodes 208. The functional elements of each of these units (i.e., the OLS 516, presentation layer 502 and management subsystem 514) can be implemented by specially designed circuitry, or by programmable circuitry programmed with software and/or firmware, or a combination thereof. The data storage elements of these units can be implemented using any known or convenient form or forms of data storage device.

The distributed object store 518 provides the actual data storage for the data objects in the server system 202 and includes multiple data constituent volumes (may interchangeably be referred to as distinct single-node object stores 520). A "single-node" object store or data constituent volume is an object store that is implemented entirely within one node. Each data constituent volume 520 is a logical (non-physical) container of data, such as a data constituent volume or a logical unit (LUN). Some or all of the data constituent volumes 520 that make up the distributed object store 518 can be implemented in separate server nodes 208. Alternatively, all of the data constituent volumes 520 that make up the distributed object store 518 can be implemented in the same server node. Any given server node 208 can access multiple data constituent volumes 520 and can include multiple data constituent volumes 520.

The distributed object store 518 provides location-independent addressing of data objects (i.e., data objects can be moved among data constituent volumes 520 without changing the data objects' addressing), with the ability to span the object address space across other similar systems spread over geographic distances. Note that the distributed object store 518 has no namespace; the namespace for the server system 202 is provided by the presentation layer 502.

The term "namespace" as used herein refers to a virtual hierarchical collection of unique volume names or identifiers and directory paths to the volumes, in which each volume represents a virtualized container storing a portion of the namespace descending from a single root directory. For example, each volume associated with a namespace can be configured to store one or more data containers, scripts, word processing documents, executable programs and others.

The presentation layer 502 provides access to the distributed object store 518. It is generated by at least one presentation module 500 (i.e., it may be generated collectively by multiple presentation modules 500, one in each multiple server nodes 208). The presentation module 500 can be in the form of specially designed circuitry, or programmable circuitry programmed with software and/or firmware, or a combination thereof.

The presentation layer 502 receives client requests, translates them into an internal protocol and sends them to the appropriate D-module 216. The presentation layer 502 provides two or more independent interfaces for accessing stored data, e.g., a conventional NAS interface 504 and a Web Service interface 508. The NAS interface 504 allows access to the object store 518 via one or more conventional NAS protocols, such as NFS and/or CIFS. Thus, the NAS interface 504 provides a file system-like interface to the content repository.

The Web Service interface 508 allows access to data stored in the object store 518 via either "named object access" or "raw object access" (also called "flat object access"). Named object access uses a namespace (e.g., a file system-like directory-tree interface for accessing data objects), as does NAS access; whereas raw object access uses system-generated global object IDs to access data objects, as described further below. The Web Service interface 508 allows access to the object store 518 via Web Service (as defined by the W3C), using for example, a protocol such as Simple Object Access Protocol (SOAP) or a RESTful (REpresentational State Transfer-ful) protocol, over HTTP.

The presentation layer 502 further provides at least one namespace 506 (may also be referred to as namespace volume) for accessing data via the NAS interface or the Web Service interface. In one embodiment this includes a Portable Operating System Interface (POSIX) namespace. The NAS interface 504 allows access to data stored in the object store 518 via the namespace(s) 506. The Web Service interface 508 allows access to data stored in the object store 518 via either the namespace(s) 506 (by using named object access) or without using the namespace(s) 506 (by using "raw object access"). Thus, the Web Service interface 508 allows either named object access or raw object access; and while named object access is accomplished using a namespace 506, raw object access is not. Access by the presentation layer 502 to the object store 518 is via either a "fast path" 524 or a "slow path" 522, as discussed further below.

The function of the OLS 516 is to store and provide valid location IDs (and other information, such as policy IDs) of data objects, based on their global object IDs (these parameters are discussed further below). This is done, for example, when a client 204 requests access to a data object by using only the global object ID instead of a complete object handle including the location ID, or when the location ID within an object handle is no longer valid (e.g., because the target data object has been moved). Note that the system 202 thereby provides two distinct paths for accessing stored data, namely, the fast path 524 and the slow path 522. The fast path 524 provides data access when a valid location ID is provided by a client 204 (e.g., within an object handle). The slow path 522 makes use of the OLS and is used in all other instances of data access. The fast path 524 is so named because a target data object can be located directly from its (valid) location ID, whereas the slow path 522 is so named because it requires a number of additional steps (relative to the fast path) to determine the location of the target data object.

The management subsystem 514 includes a content management component 510 and an infrastructure management component 512. The infrastructure management component 512 includes logic to allow an administrative user to manage the storage infrastructure (e.g., configuration of nodes, storage devices, volumes, LUNs, etc.). The content management component 510 is a policy based data management subsystem for managing the lifecycle of data objects (and optionally the metadata) stored in the content repository, based on user-specified policies. It can execute actions to enforce defined policies in response to system-defined trigger events and/or user-defined trigger events (e.g., attempted creation, deletion, access or migration of an object).

The specified policies may relate to, for example, system performance, data protection and data security. Performance related policies may relate to, for example, which logical container a given data object should be placed in, migrated from or to, when the data object should be migrated or deleted, etc. Data protection policies may relate to, for example, data backup and/or data deletion. Data security policies may relate to, for example, when and how data should be encrypted, who has access to particular data, etc. The specified policies can also include polices for power management, storage efficiency, data retention, and deletion criteria. The policies can be specified in any known, convenient or desirable format and method. A "policy" in this context is not necessarily an explicit specification by a user of where to store what data, when to move data, etc. Rather, a "policy" can be a set of specific rules regarding where to store what, when to migrate data, etc., derived by the system from the end user's SLOs, i.e., a more general specification of the end user's expected performance, data protection, security, etc. For example, an administrative user might simply specify a range of performance that can be tolerated with respect to a particular parameter and in response the management subsystem 514 would identify the appropriate data objects that need to be migrated, where they should get migrated to, and how quickly they need to be migrated.

Figure 5B:
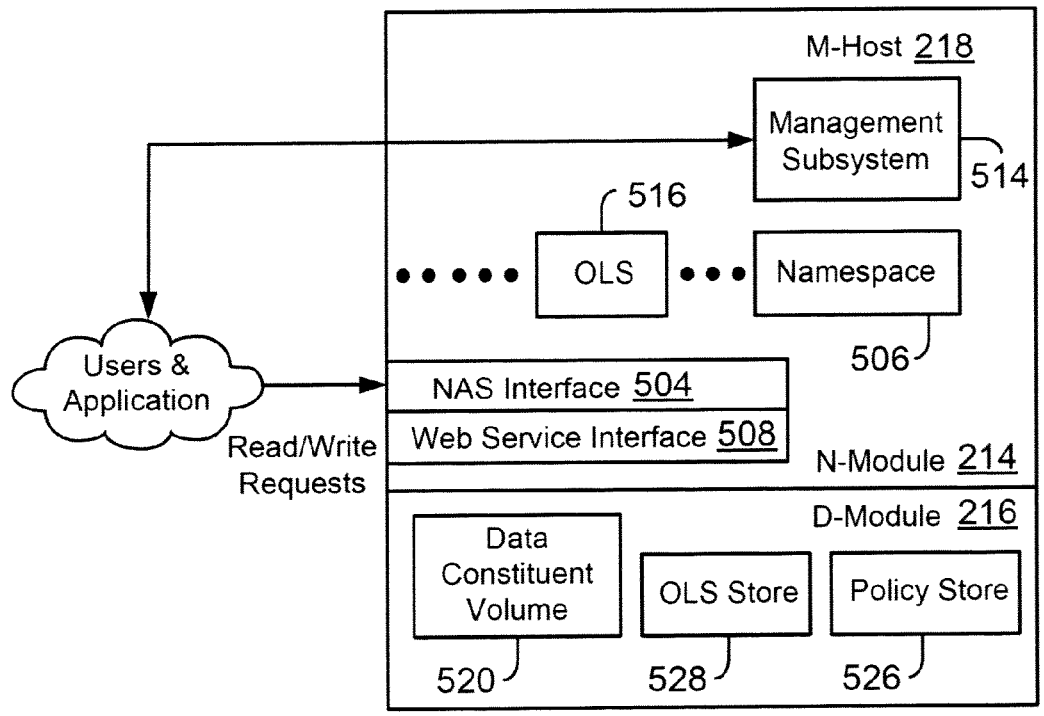
FIG. 5B illustrates a content repository that can be implemented in the clustered architecture of FIGS. 2 through 4.

FIG. 5B illustrates an example of how the content repository can be implemented relative to the clustered architecture in FIGS. 2 through 4. Although FIG. 5B illustrates the system relative to a single server node 208, it will be recognized that the configuration shown in FIG. 5B actually can be implemented by two or more (or all) of the server nodes 208 in a cluster.

In one embodiment, the distributed object store 518 is implemented by providing at least one data constituent volume 520 in each of at least two D-modules 216 in the system (any given D-module 216 can include zero or more single node object stores 520). Also implemented in each of at least two D-modules 216 in the system are: an OLS store 528 that contains mapping data structures used by the OLS 516 including valid location IDs and policy IDs; and a policy store 526 (e.g., a database) that contains user-specified policies relating to data objects (note that at least some policies or policy information may also be cached in the N-module 214 to improve performance).

The presentation layer 502 is implemented at least partially within each N-module 214. In one embodiment, the OLS 516 is implemented partially by the N-module 214 and partially by the corresponding M-host 218, as illustrated in FIG. 5B. More specifically, in one embodiment the functions of the OLS 516 are implemented by a special daemon in the M-host 218 and by the presentation layer 502 in the N-module 214.

In one embodiment, the management subsystem 514 is implemented at least partially within each M-host 218. Nonetheless, in some embodiments, any of these subsystems may also be implemented at least partially within other modules. For example, at least a portion of the content management component 510 of the management subsystem 514 can be implemented within one or more N-modules 214 to allow, for example, caching of policies in such N-modules and/or execution/application of policies by such N-module(s). In that case, the processing logic and state information for executing/applying policies may be contained in one or more N-modules 214, while processing logic and state information for managing policies is stored in one or more M-hosts 218. Administrative users can specify policies for use by the management subsystem 514, via a user interface provided by the M-host 218 to access the management subsystem 514.

Figure 5C:
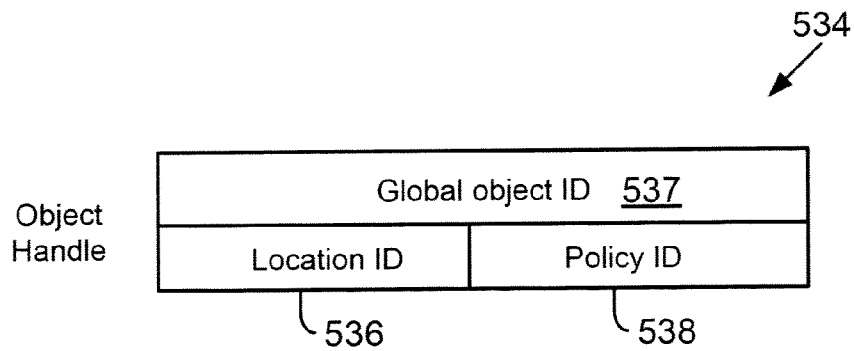
FIG. 5C illustrates a multilevel object handle, according to one embodiment.

As noted above, the distributed object store enables both path-based access to data objects as well as direct access to data objects. For purposes of direct access, the distributed object store uses a multilevel object handle, as illustrated in FIG. 5C. When a client 204 creates a data object, it receives an object handle 534 as the response to creating the object. This is similar to a file handle that is returned when a file is created in a traditional storage system. The first level of the object handle is a system-generated globally unique number, called a global object ID, 537 that is permanently attached to the created data object. The second level of the object handle is a "hint" which includes the location ID 536 of the data object and, in the illustrated embodiment, the policy ID 538 of the data object. Clients 204 can store this object handle 534, containing the global object ID 537, location ID 536 and policy ID 538.

When a client 204 attempts to read or write the data object using the direct access approach, the client includes the object handle of the object in its read or write request to the server system 202. The server system 202 first attempts to use the location ID (within the object handle), which is intended to be a pointer to the exact location within a volume where the data object is stored. In the common case, this operation succeeds and the object is read/written. This sequence is the "fast path" 524 for I/O (see FIG. 5A).

If, however, an object is moved from one location to another (for example, from one volume to another), the server system 202 creates a new location ID for the object. In that case, the old location ID becomes stale (invalid). The client may not be notified that the object has been moved or that the location ID is stale and may not receive the new location ID for the object, at least until the client subsequently attempts to access that data object (e.g., by providing an object handle with an invalid location ID). Or, the client may be notified but may not be able or configured to accept or understand the notification.

The current mapping from global object ID to location ID is stored reliably in the OLS 516. If, during fast path I/O, the server system 202 discovers that the target data object no longer exists at the location pointed to by the provided location ID, this means that the object must have been either deleted or moved. Therefore, at that point the server system 202 will invoke the OLS 516 to determine the new (valid) location ID for the target object. The server system 202 then uses the new location ID to read/write the target object. At the same time, the server system 202 invalidates the old location ID and returns a new object handle to the client that contains the unchanged and unique global object ID, as well as the new location ID. This process enables clients to transparently adapt to objects that move from one location to another (for example in response to a change in policy).

An enhancement of this technique is for a client 204 never to have to be concerned with refreshing the object handle when the location ID changes. In this case, the server system 202 is responsible for mapping the unchanging global object id to location ID. This can be done efficiently by compactly storing the mapping from global object ID to location ID in, for example, cache memory of one or more N-modules 214.

As noted above, the distributed object store enables path-based access to data objects as well, and such path-based access is explained in further detail in the following sections.

Object Location Transparency using the Presentation Layer:

In a traditional storage system, a file is represented by a path such as "/u/foo/bar/file.doc". In this example, "u" is a directory under the root directory "/", "foo" is a directory under "u", and so on. Therefore, a file is uniquely identified by a single path. However, since file handles and directory handles are tied to location in a traditional storage system, an entire path name is tied to a specific location (e.g., an inode of the file), making it very difficult to move files around without having to rename them.

An inode is a data structure, e.g., a 128-byte structure, which is used to store information, such as meta-data, about a data container, for example, a file. The meta-data contained in an inode may include data information, e.g., ownership of the file, access permission for the file, size of the file, file type and location of the file on disk, as described below. The file system uses a file handle, i.e., an identifier that includes an inode number, to retrieve an inode from a storage disk.

Figure 5D:
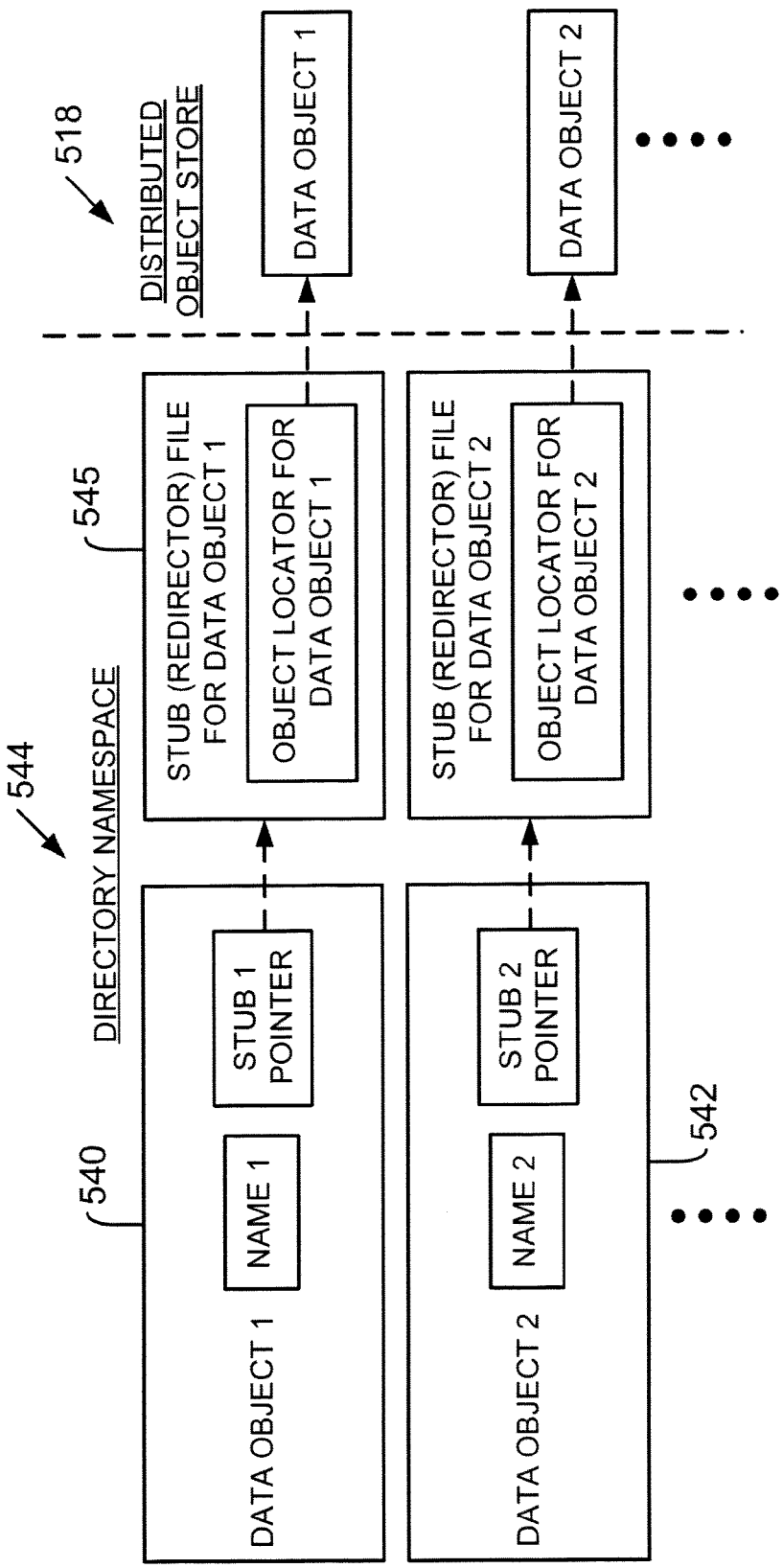
FIG. 5D illustrates a mechanism for a storage system to introduce a layer of separation between a directory entry of a data object and the physical location where the data object is stored, according to one embodiment.

Now refer to FIG. 5D, which illustrates a mechanism that allows the server system 202 to break the tight relationship between path names and location. As illustrated in the example of FIG. 5D, path names of data objects in the server system 202 are stored in association with a namespace (e.g., a directory namespace 544). The directory namespace 544 maintains a separate directory entry (e.g., 540, 542) for each data object stored in the distributed object store 518. A directory entry, as indicated herein, refers to an entry that describes a name of any type of data object (e.g., directories, files, logical containers of data, etc.). Each directory entry includes a path name (e.g., NAME 1) (i.e., a logical address) of the data object and a pointer (e.g., REDIRECTOR POINTER 1 (shown as stub 1 pointer) for mapping the directory entry to the data object.

In a traditional storage system, the pointer (e.g., an inode number) directly maps the path name to an inode associated with the data object. On the other hand, in the illustrated embodiment shown in FIG. 5D, the pointer of each data object points to a stub file or a "redirector file" (used interchangeably throughout this specification) associated with the data object. A redirector file, as indicated herein, refers to a file that maintains an object locator of the data object. The object locator of the data object could either be the multilevel object handle 534 or just the global object ID of the data object. In the illustrated embodiment, the redirector file (e.g., redirector file for data object 1) is also stored within the directory namespace 544. In addition to the object locator data, the redirector file may also contain other data, such as metadata about the location of the redirector file, etc.

As illustrated in FIG. 5D, for example, the pointer included in the directory entry 540 of data object 1 points to a redirector file 545 for data object 1 (instead of pointing to, for example, the inode of data object 1). The directory entry 540 does not include any inode references to data object 1. The redirector file for data object 1 includes an object locator (i.e., the object handle or the global object ID) of data object 1. As indicated above, either the object handle or the global object ID of a data object is useful for identifying the specific location (e.g., a physical address) of the data object within the distributed object store 518. Accordingly, the server system 202 can map the directory entry of each data object to the specific location of the data object within the distributed object store 518. By using this mapping in conjunction with the OLS 516 (i.e., by mapping the path name to the global object ID and then mapping the global object ID to the location ID), the server system 202 can mimic a traditional file system hierarchy, while providing the advantage of location independence of directory entries.

By having the directory entry pointer of a data object point to a redirector file (containing the object locator information) instead of pointing to an actual inode of the data object, the server system 202 introduces a layer of indirection between (i.e., provides a logical separation of) directory entries and storage locations of the stored data object. This separation facilitates transparent migration (i.e., a data object can be moved without affecting its name), and moreover, it enables any particular data object to be represented by multiple path names, thereby facilitating navigation. In particular, this allows the implementation of a hierarchical protocol such as NFS on top of an object store, while at the same time allowing access via a flat object address space (wherein clients directly use the global object ID to access objects) and maintaining the ability to do transparent migration.

Figure 5E:
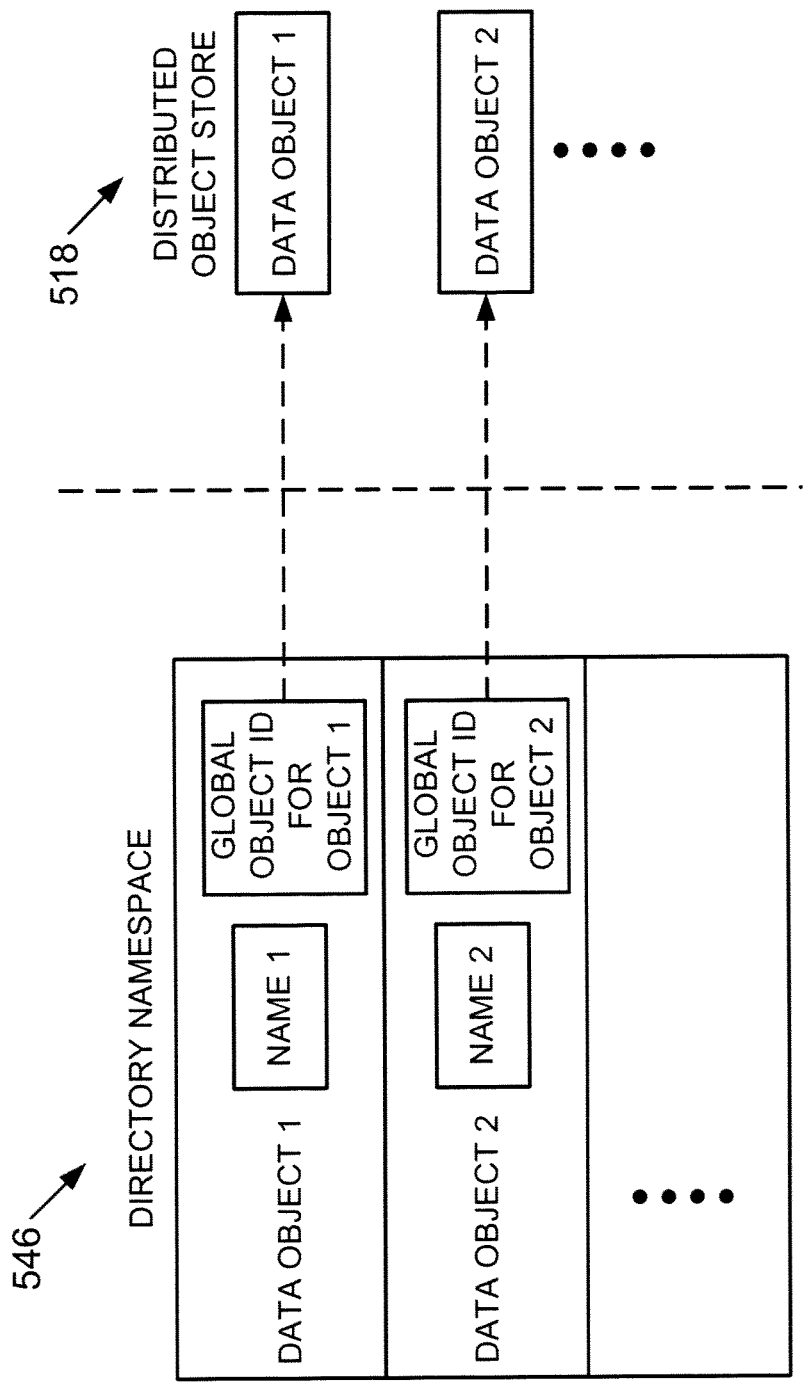
FIG. 5E illustrates a mechanism that allows a storage system to introduce a layer of separation between the directory entry of the data object and the physical location of the data object by including a global object ID within the directory entry.

In one embodiment, instead of using a redirector file for maintaining the object locator (i.e., the object handle or the global object ID) of a data object, the server system 202 stores the global object ID of the data object directly within the directory entry of the data object. An example of such an embodiment is depicted in FIG. 5E. In the illustrated example, the directory entry for data object 1 includes a path name and the global object ID of data object 1. In a traditional server system, the directory entry would contain a path name and a reference to an inode (e.g., the inode number) of the data object. Instead of storing the inode reference, the server system 202 stores the global object ID of data object 1 in conjunction with the path name within the directory entry of data object 1. As explained above, the server system 202 can use the global object ID of data object 1 to identify the specific location of data object 1 within the distributed object store 518. In this embodiment, the directory entry includes an object locator (i.e., a global object ID) instead of directly pointing to the inode of the data object, and therefore still maintains a layer of indirection between the directory entry and the physical storage location of the data object. As indicated above, the global object ID is permanently attached to the data object and remains unchanged even if the data object is relocated within the distributed object store 518.

Figure 6:
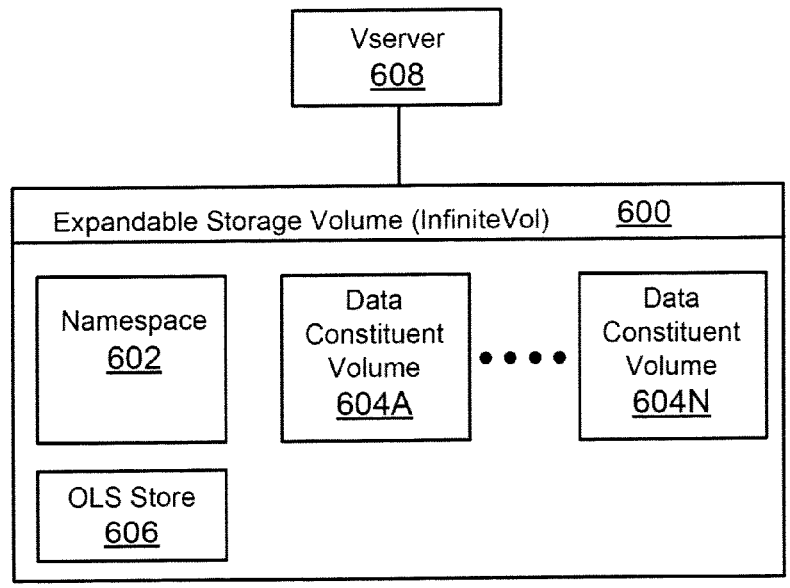
FIG. 6 shows a block diagram of an expandable storage volume that is replicated according to one embodiment.

Infinite Volume:

FIG. 6 shows an example of an expandable storage volume (may also be referred to as an Infinite Volume or "InfiniteVol") 600 that may be presented to a vserver 608 and used by clients for storing information within the content repository described above, according to one embodiment. InfiniteVol 600 may include a namespace 602 (similar to namespace 506 described above with respect to FIGS. 5A-5D), a plurality of data constituent volumes 604A-604N and an OLS store 606 (similar to OLS store 528 (FIG. 5B). The data constituent volumes are similar to a single node object stores 520 described above with respect to FIGS. 5A-5D. The namespace 602 is used to store the directory 544 or directory namespace 546, described above in detail. Each data constituent volume may have its own file system and may be used to store user information and metadata.

Figure 7A:
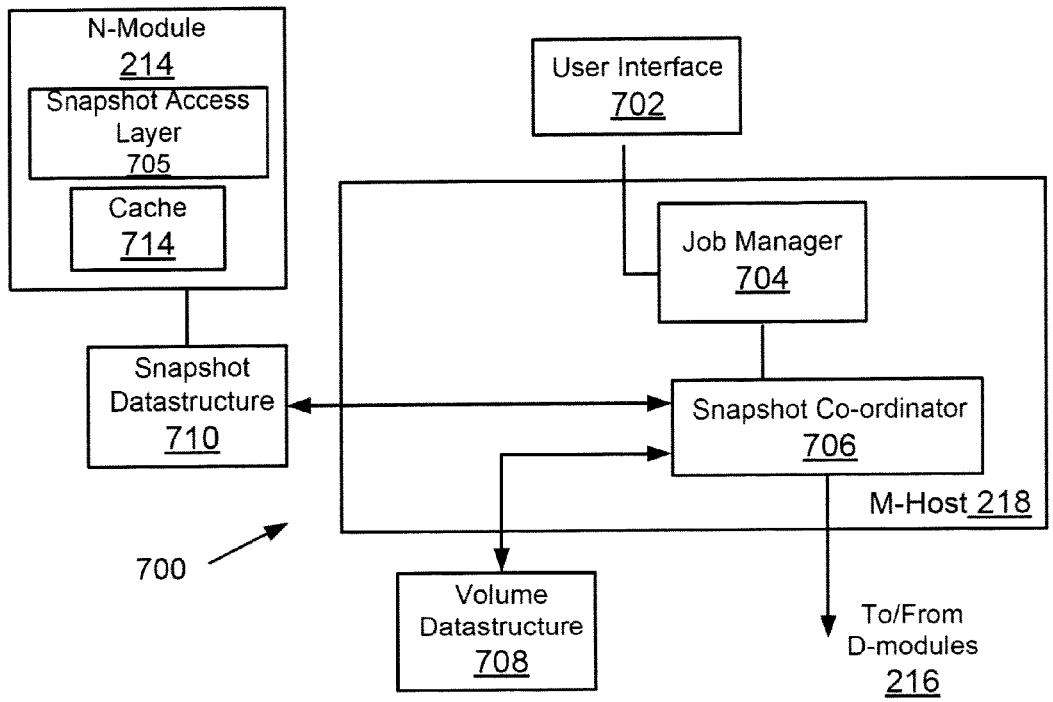
FIG. 7A shows a block diagram of a system for replicating an expandable storage volume, according to one embodiment.

In one embodiment, information regarding the various volumes of InfiniteVol 600, for example, identifiers for identifying the various volumes, vserver identifiers and other information may be stored in a data structure, for example, 220 (FIG. 2) or 708 (FIG. 7A). This allows a user to expand or contract the size of the InfiniteVol 600 based on user needs. When a new data constituent volume is added to InfiniteVol 600, the data structure 708 is updated to include information regarding the new volume. When a volume is removed from InfiniteVol 600, then the information regarding the volume is removed from the data structure 708.

Data centers typically replicate storage volumes, for example, by taking "snapshots" such that a file system can be restored in case of a disaster. Snapshot (without derogation to any trademark rights of NetApp, Inc.) means a point in time copy of a storage file system. A snapshot is a persistent point in time image of an active file system that enables quick recovery of data after data has been corrupted, lost, or altered. Snapshots can be created by copying the data at predetermined point in time to form a consistent image, or virtually by using a pointer to form the image of the data.

Snapshots for multiple volumes, typically managed by a single node, are taken by using a "consistency" group. The consistency group is a logical structure that includes various storage volumes whose snapshots are taken at the same time. To take the snapshot of multiple volumes, first the consistency group is started and the user is given an opportunity to add any number of storage volumes. Once the volumes are added, a logical "fence" is generated by the storage operating system 306. The logical fence is a filtering mechanism that includes the information at the storage volumes in a snapshot at the time the fence is generated and excludes any read/write requests that are received after the fence is created.

The logical fence may be enabled by the storage operating system 306 by maintaining a data structure (not shown) at a storage device. The data structure tracks the I/O requests that are generated after the fence is created so that the excluded I/O requests can be handled after the snapshot is generated. Details of handling the excluded I/O requests are not germane to the inventive embodiments disclosed herein.

After the snapshot is generated, the storage volumes are "unfenced' and the consistency group is deleted. This approach operates well when the storage volumes are managed by a single node. The process however can be challenging when one has to take a snapshot for InfiniteVol 600 that includes the namespace 602, the OLS store 606 and multiple data constituent volumes 604A-604N managed by a plurality of nodes in a cluster based environment. The embodiments described herein provide systems and methods for generating snapshots for InfiniteVol 600.

FIG. 7A shows a block diagram of a system 700 for taking snapshots of InfiniteVol 600, according to one embodiment. System 700 includes a user interface 702 that may be presented to a client and may include a graphical user interface (GUI) or a command line interface (CLI). The user interface 702 may be used to request a snapshot at any given time or to setup a schedule for automatically taking snapshots at any given time intervals.

In one embodiment, system 700 includes a snapshot job manager 704 that is configured to receive a snapshot request for generating a snapshot. The snapshot job manager 704 creates a "job" for taking the snapshot. The snapshot job manager 704 may be implemented by M-host 218. The snapshot request is typically received from a client via user interface 702. The request may include an identifier (may be referred to as "repository identifier") that uniquely identifies the InfiniteVol 600 and a vserver identifier that uniquely identifies the vserver that interfaces with client systems for processing I/O requests and "owns" the InfiniteVol 600. It is noteworthy that the processes and systems described herein are not limited to using a vserver or a similar entity. A standalone storage server may be used to implement the various embodiments.

The snapshot request is passed by the snapshot job manager 704 to a snapshot coordinator 706 that may also be implemented by M-host 218. The snapshot coordinator 706 queries the volume data structure 708 to obtain information regarding the various volumes of InfiniteVol 600. The volume data structure 708 may be maintained by infrastructure management module 512 of the management subsystem 514 as described above at a storage location accessible to the infrastructure management module 512. In one embodiment, the volume data structure 708 is a searchable data structure with fields' 708A-708C shown in FIG. 7B.

Field 708A stores identification information for each vserver in the clustered environment 200 (FIG. 2), for example, Vserver 1. Field 708B identifies the InfiniteVols that are presented to each vserver identified by field 708A, for example, InfiniteVol1. The various volumes within each InfiniteVol are identified by field 708C, for example, Namspace1, OLS1 and various data constituent volumes shown as DC1-DCN. As described above, the volumes include namespace 602, data constituent volumes 604A-604N and OLS store 606.

After the snapshot coordinator 706 obtains information regarding the volumes of the InfiniteVol 600, a consistency group is started to maintain consistency across a plurality of nodes 208. An example of a consistency group 716 is shown in FIG. 7C. The consistency group 716 may include the namespace 718, OLS store 722 and data constituent volumes 720A-720N. When the consistency group is started at a given time, a logical "fence" is created first for the namespace 718, then for the OLS store 722, followed by the data constituent volumes. The term fence as used herein means that the information within each volume, when the consistency group is started would be included in the snapshot. This includes the completed write requests as well as updated redirector files, namespace and OLS store information. Any read/write operations after the consistency group is created are "fenced" off and are not included in the snapshot.

After a snapshot is taken, the consistency group goes through a "commit" operation which indicates that the snapshot operation was a success and during the commit operation the volumes are unfenced. It is noteworthy that even if the snapshot operation is not a success, the volumes are still unfenced. The order in which the volumes are unfenced is opposite to the order in which the volumes were fenced. For example, the namespace 718 is fenced first and unfenced last. The data constituent volume 720N is fenced last and unfenced first.

One reason the namespace 718 is fenced first is because it includes the directory namespace (for example, 544, FIG. 5D) and stub files (for example, 545, FIG. 5D). The stub files are used to access data objects that are stored by the data constituent volumes. If the namespace is not fenced and a data constituent volume is fenced off then there may be a mismatch between the namespace entries and the stored data objects at the data constituent volumes. By fencing the namespace first, one can ensure that the data objects stored at that point in time will be consistent for a given snapshot across the plurality of volumes managed by a plurality of nodes.

The snapshot is taken at a given time across multiple nodes. Once the snapshot is taken, the storage volumes are unfenced in the order described above. A snapshot data structure 710 (FIG. 7A) is then updated or generated if one does not exist. The snapshot data structure 710 is stored at a memory location that is accessible to management subsystem 514. An example of the snapshot data structure is shown in FIG. 7D having a plurality of fields, for example, fields 710A-710G that are now described in detail.

Field 710A identifies the vserver that is associated with the InfiniteVol 600 for which a snapshot is taken at any given time. Field 710B identifies the InfiniteVol 600 that is replicated. Field 710C provides a name for the overall snapshot and field 710D provides an identifier for the overall snapshot of InfiniteVol 600. Field 710E provides a snapshot identifier for each volume of InfiniteVol 600 that is replicated and field 710F identifies each volume corresponding to the snapshot identifier of field 710E. Field 710G provides a timestamp for each snapshot providing a time when the snapshot was taken.

Snapshot data structure 710 may be used to present snapshots of multiple volumes across multiple nodes to a user as a single logical entity. For example, assume that an InfiniteVol having an identifier, InfiniID1 includes 6 volumes, including a namespace identified by Vn1, an OLS store identified by Vols1 and four data constituent volumes Vd1-Vd4. The snapshot for the entire InfiniteVol may be identified as S1 and may be represented by an object (S1, InfiniD1). The snapshot of the namespace may be represented as Sn1 and the snapshot of the OLS store may be identified by Sols1. The snapshots of the four data constituent volumes may be identified by Sd1, Sd2, Sd3 and Sd4. The overall snapshot may be represented as:

(S1, InfiniD1)=(Sn1, Vn1), (Sols1, Vols1), (Sd1, Vd1), (Sd2, Vd2), (Sd3, Vd3), (Sd4, Vd4).

S1, InfiniD1 may be used to manage the snapshots for various volumes of an InfiniteVol. S1, InfiniD1 may be presented to a storage administrator using management console 116 (FIG. 1) for managing the various snapshots. A user (for example, client 104) is only presented with a single object for example, (Sn1, Vn1) to access the various individual snapshots and is unaware of how the individual snapshots for various volumes are being handled by the underlying system. The user is able to access the entire snapshot using a single object, as described below in more detail.

Once the snapshot data structure 710 is updated that information is then uploaded to a cache 714 of N-Blade 214. In one embodiment, cache 714 may be used to respond to client requests to access snapshots via a snapshot access layer 705 (may also be called a data access layer), as described below in detail.

Figure 8:
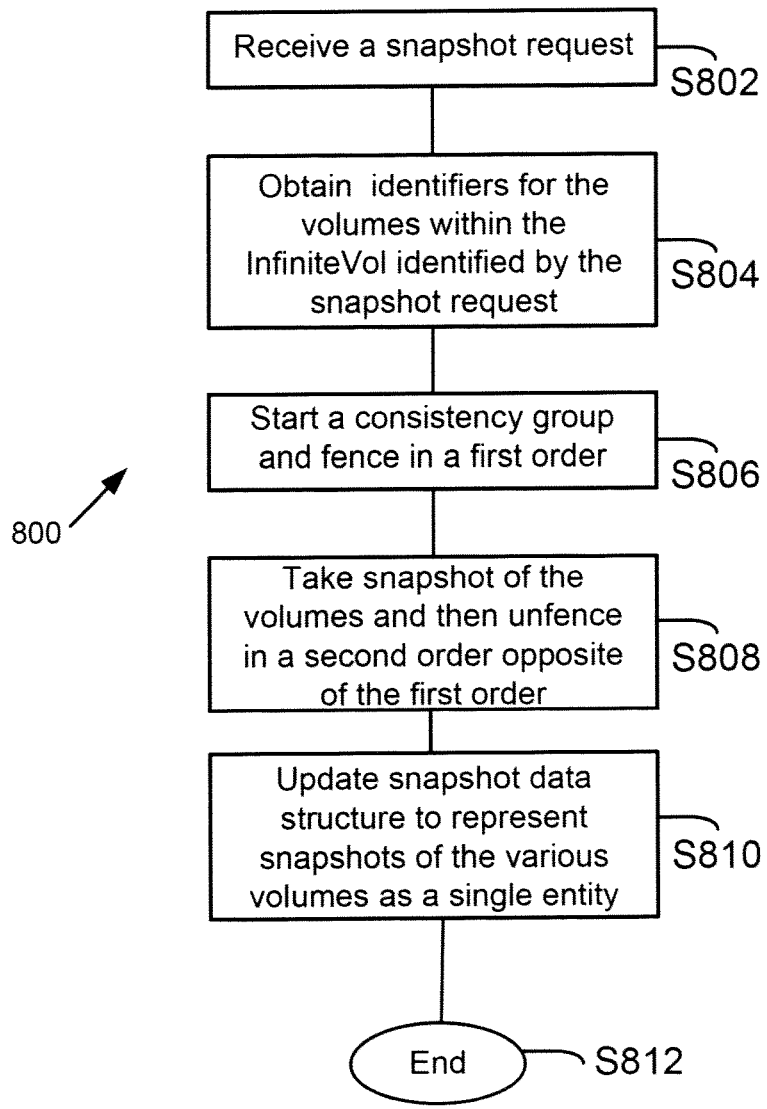
FIG. 8 is a process flow for replicating an expandable storage volume, according to one embodiment.

FIG. 8 shows a process 800 for generating a snapshot for InfiniteVol 600 having the namespace 602, the OLS store 606 and the data constituent volumes 604A-604N managed by a plurality of nodes. The process starts in block S802 when a request to generate a snapshot of InfiniteVol 600 is received. In block S804, snapshot coordinator 706 obtains identifiers for the volumes within InfiniteVol 600. This includes identifiers for the namespace, the OLS store and the data constituent volumes. The identifier information may be obtained from the volume data structure 708 described above with respect to FIG. 7B. Snapshot coordinator 706 uses an identifier for the InfiniteVol 600 and an identifier for the vserver as an index into the volume data structure 708 to retrieve the storage volume information.

In block S806, snapshot coordinator 706 starts a consistency group for the volumes within InfiniteVol 600 that are to be included in the snapshot. Namespace 602 is fenced first followed by the OLS store 606 and the data constituent volumes 604A-604N. Storage operating system 306 (or snapshot coordinator 706) tracks the order in which the volumes are fenced across multiple volumes and multiple nodes. The tracking may be performed by maintaining a data structure that stores information regarding namespace 602, OLS store 606 and the data constituent volumes 604A-604N. The fence is applied in a serial manner such that the fence order mentioned above can be maintained. A time stamp for recording each fence may also be used for maintaining the order.

The namespace 602 is fenced first because it is presented to users and includes the directory namespace 544 with directory entries 540 and stub files 545. The directory entries 540 store pointers to the stub files 545 that point to various objects stored at the data constituent volumes 604A-604N. By fencing the namespace 602 first, one can ensure that no changes to the stub files will be made after the fence is generated.

In block S808, the snapshots for the storage volumes are taken at the same time. Once the snapshots are taken, the storage volumes are "unfenced" in block S810. The order in which the volumes are unfenced is opposite to the order in which the volumes are fenced in block S806 i.e. the namespace 602 is unfenced last, while the data constituent volume that was fenced last is unfenced first. By unfencing the namespace 602 last, one can ensure that various stub files point to the appropriate, unfenced data constituent volumes. If a data constituent volume is fenced and the namespace 602 is unfenced then a user can submit a request to read or write an object but the request will not be serviced properly because the data constituent volume is still fenced when the request is received and therefore, an error may be generated.

Storage operating system 306 (or snapshot coordinator 706) maintains a record (not shown) of the order in which storage volumes are fenced. This information may be stored at any storage location that is accessible to snapshot coordinator 706 or any other module that can provide this information to snapshot coordinator 706.

Thereafter, in block S810, snapshot coordinator 706 updates the snapshot data structure 710 that has been described above in detail with respect to FIG. 7D. The snapshot can then be presented as a single entity to a user. The snapshot has its own name and identifier that can be used to access the snapshots of the underlying storage volumes, as described below in more detail. Thereafter, the process ends in block S812.

Figure 9A:
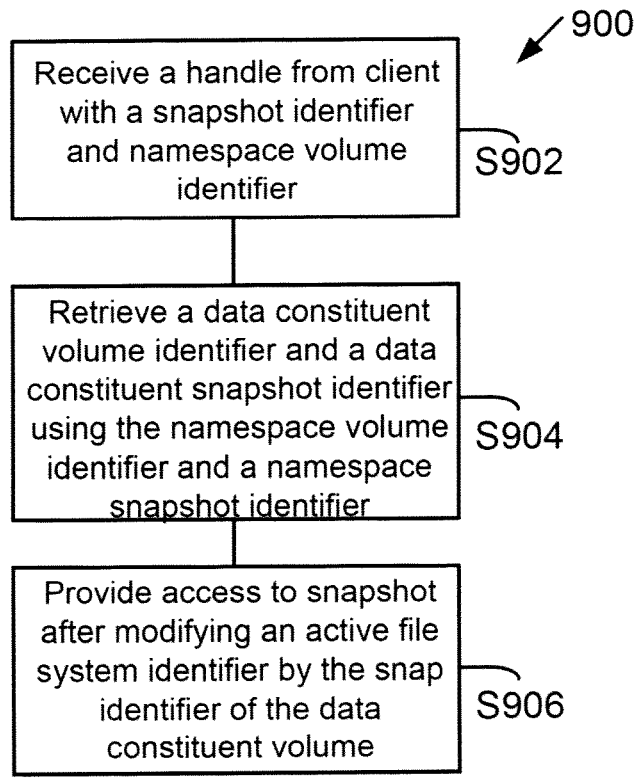
FIG. 9A is a process flow diagram for accessing a replicated version of an expandable storage volume, according to one embodiment.

FIG. 9A shows a process 900 for accessing a snapshot of the InfiniteVol 600 taken by the process described above with respect to FIG. 8. The process begins in block S902, when a handle to access the snapshot is received by the snapshot access layer 705. The handle includes a snapshot identifier for the snapshot of the namespace and a namespace identifier, for example, Sn1, Vn1, as described above.

In block S904, the snapshot access layer 705 retrieves a data constituent volume identifier and a snapshot identifier for the data constituent volume using the namespace identifier and the snapshot identifier from the snapshot data structure 710 that has been described above.

In block S906, an active file system identifier (as stored in the stub/redirector file 545) is replaced by the data constituent snapshot identifier and a handle is provided to the D-module 216 that manages the data constituent volume and its snapshot. Thereafter, access to the snapshot of the data constituent volume is provided to the user.

Figure 9B:
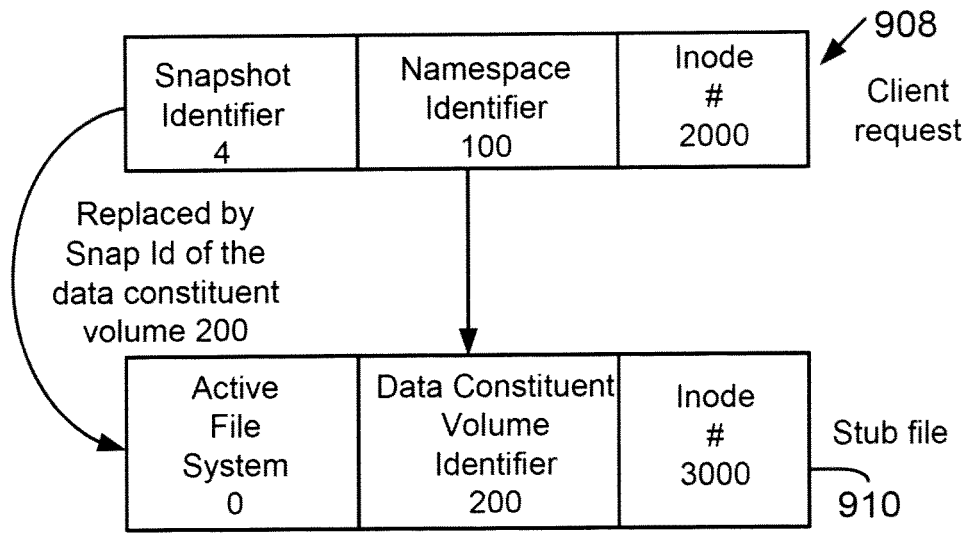
FIG. 9B shows an example of implementing the process of FIG. 9A, according to one embodiment.

An example of implementing process 900 is shown in FIG. 9B. The initial file handle (or client request) 908 includes a snapshot identifier 4, a namespace identifier 100 and an inode identifier 2000. The namespace identifier points to a stub file 910 that includes a data constituent volume identifier 200 with an inode identifier 3000. The active file system value, which may be 0 is replaced by 3, the snapshot identifier for data constituent volume 200. The snapshot identifier value of 3 is obtained by using the various fields of snapshot data structure 710 described above.

Data handle 910 with the snapshot identifier 3, volume identifier 200 and inode number 3000 is provided to the D-module 216 that manages the data constituent volume 200. The D-module 216 then returns the snapshot data that is provided to the client.

In one embodiment, clients within a content repository are provided with an expandable storage volume having a plurality of volumes that may be managed by different storage server nodes. The plurality of volumes is replicated using the techniques described above. The clients can use a single object to access each replicated volume without having to spend any resources in managing the replicated volumes.

Disaster Recovery:

Due to proliferation of electronic information, disaster recovery is a significant aspect of managing data storage centers. Typically, information at a data center is stored at a primary storage location managed by a primary storage system. Information stored at the primary location is replicated and stored as a snapshot at the primary location. The snapshot from the primary location may be mirrored at another location (may be referred to as remote location) and stored as a base snapshot. When the information at the primary location changes, the changed information is mirrored to the remote location. Thus the base snapshot is updated at the remote location as information at the primary location changes.

If the primary location becomes inoperable due to a disaster (for example, flooding, earthquake or any other reason), then a latest snapshot at the remote location consistent with the primary location is presented to the clients. The clients then use the remote location to store information. After the primary location becomes available again, the information stored at the remote location is synchronized with the information stored at the primary location before the disaster. As part of the synchronization, a snapshot of the remote location is taken so that the information stored at the remote location after the remote location became available can be synchronized with the information stored at the primary location prior to the disaster. NetApp Inc. provides SnapMirror® technology (without derogation of any trademark rights of NetApp Inc.) for such a disaster recovery solution.

SnapMirror based disaster recovery solutions become complex in storage environments having InfiniteVols described above. Since an InfiniteVol includes a namespace, an OLS store and a plurality of data constituent volumes that are managed by different nodes, maintaining an accurate mirrored copy of the InfiniteVol at the remote location, presenting an accurate view of the InfiniteVol from the remote location after a disaster and then re-synchronizing the remote location with the primary location can be challenging. The adaptive embodiments described herein provide disaster recovery solutions for an environment using InfiniteVols.

Figure 10A:
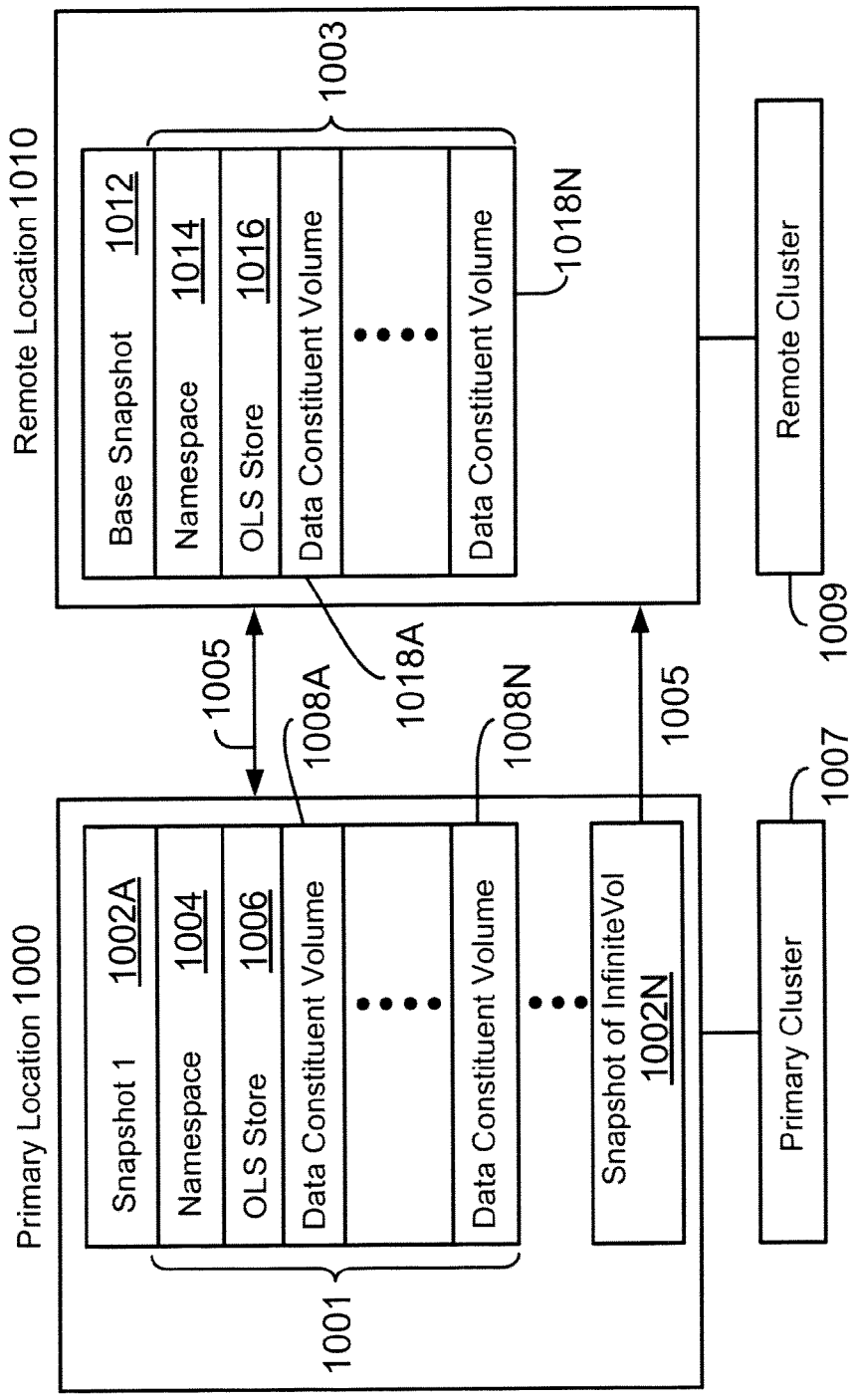
FIG. 10A shows a block diagram of a disaster recovery system, according to one embodiment.

FIG. 10A shows an example of a disaster recovery system 1007A, according to one embodiment. System 1007A includes a primary location 1000 having an InfiniteVol 1001 (may also be referred to as source InfiniteVol) that is replicated at a remote location 1010 (may also be referred to as destination location 1010) using an InfiniteVol 1003 (may also be referred to as remote InfiniteVol 1003 or destination InfiniteVol 1003). The primary location is managed by a primary cluster 1007 and the remote location 1010 is managed by a remote cluster 1009 (may also be referred to as the destination cluster 1009). Both the primary and remote clusters are similar to cluster 202 described above with respect to FIG. 2.

The InfiniteVol 1001 includes a namespace 1004, an OLS store 1006 and data constituent volumes 1008A-1008N similar to namespace 602, OLS store 606 and the data constituent volumes 604A-604N described in detail above with respect to FIG. 6. The primary location 1000 stores at least a first snapshot 1002A of InfiniteVol 1001. The first snapshot 1002A is transferred from the primary location 1000 to the remote location 1010 using a replication protocol 1005. In one embodiment, the replication protocol 1005 is a block replication protocol (for example, the Spin network protocol (SpinNP) protocol provided by NetApp Inc., the assignee of this application (without derogation of any trademark rights) that replicates information from the primary location 1000 to the remote location 1010 on a block-by-block basis.

SpinNP comprises a collection of methods/functions constituting a SpinNP application programming interface (API). The SpinNP API, in this context, is a set of software calls and routines that are made available (exported) by a process and that can be referenced by other processes. SpinNP protocol communication in a cluster (for example, 202, FIG. 2) occurs via connections. Communication is illustratively effected by a D-blade 216 (See FIG. 2) exposing the SpinNP API to which an N-blade 214 (See FIG. 2) (or another D-blade) issues calls. To that end, the CF interface modules 400A/400B described above in detail with respect to FIG. 4 are organized as a CF encoder and a CF decoder. The CF encoder of, e.g., CF interface 400A on N-blade 214 encapsulates a SpinNP message as (i) a local procedure call (LPC) when communicating a command to a D-blade 216 residing on the same node or (ii) a remote procedure call (RPC) when communicating the command to a D-blade 216 residing on a remote node of a cluster. In either case, the CF decoder of CF interface 400B on the D-blade de-encapsulates the SpinNP message and processes the command. The adaptive embodiments described herein are not limited to SpinNP or any specific network protocol/standard.

The remote InfiniteVol 1003 also includes namespace 1014, OLS store 1016 and a plurality of data constituent volumes 1018A-1018N. The remote location 1010 stores a base snapshot 1012, which is a copy of snapshot 1 1002A. The namespace 1014 may be a replicated copy of namespace 1004, the OLS store 1016 may be a replicated copy of the OLS store 1006 and the plurality of data constituent volumes 1018A-1018N maybe a replication of data constituent volumes 1008A-1008N.

As InfiniteVol 1001 changes over time at the primary location 1000, more snapshots are taken of InfiniteVol 1001. These snapshots are shown as 1002N. The changes between snapshot 1 1002A and 1002N are frequently sent to the remote location 1010 so that the remote location 1010 is synchronized with the latest snapshot of InfiniteVol 1001. The process of taking the snapshots and managing the snapshots is similar to the processes described above.

Figure 10B:
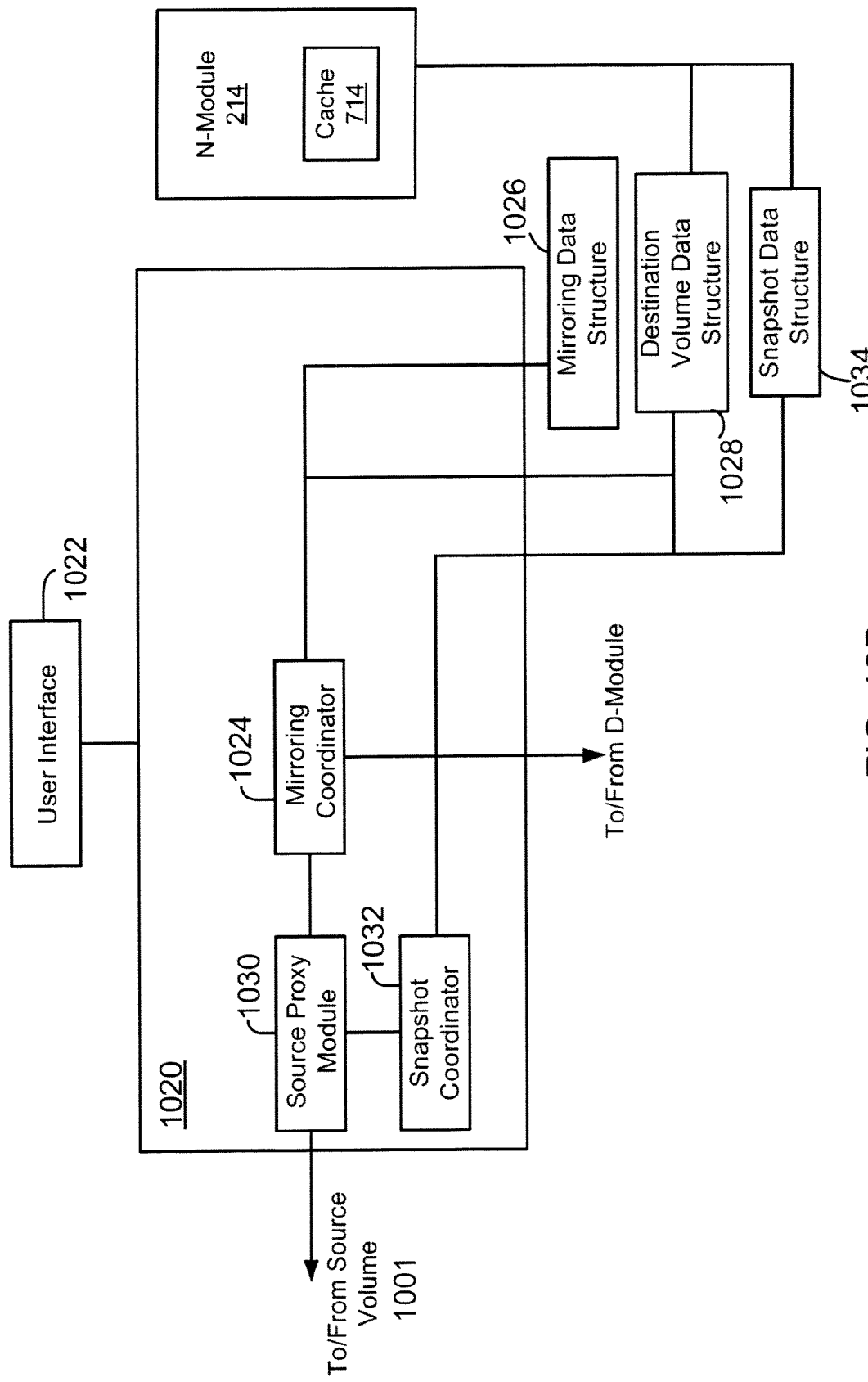
FIG. 10B shows an example a system for replicating a point in time copy of a primary storage volume, according to one embodiment.

FIG. 10B shows a block diagram of a system 1020 for providing a disaster recovery copy of a snapshot of the InfiniteVol 1001 at the primary location 1000, according to one embodiment. The copy may be generated based on a programmed schedule or requested via a user interface 1022 provided to a user by M-module 218.

In one embodiment, system 1020 or portions thereof are executed at the remote location 1110 (FIG. 10A) by M-module 218 (FIG. 2). System 1020 includes a mirroring coordinator 1024 that coordinates various tasks for generating the disaster recovery copy at the remote location 1010. Mirroring coordinator 1024 has access to a destination volume data structure 1028 and a mirroring data structure 1026 that are described below in more detail. Mirroring coordinator 1024 communicates with the storage systems of the primary location 1000 via a source proxy module 1030. The source proxy module 1030 is used to send and receive information to and from the primary location 1000. In one embodiment, the source proxy module 1030 is configured to format information that is transmitted to and received from primary location 1000.

System 1020 also includes a snapshot coordinator 1032 similar to snapshot coordinator 706. Snapshot coordinator 1032 maintains a snapshot data structure 1034 similar to snapshot data structure 710 described above with respect to FIG. 7D. It is noteworthy that data structures 1026, 1028 and 1034 may be stored at a storage device at any location, as long as the storage device is accessible, directly or indirectly, by N-Module 214 and the various components of system 1020. Details regarding system 1020 operations are now provided with respect to the process flow diagrams of FIGS. 11A, 12A-12B and 13.

Figure 11A:
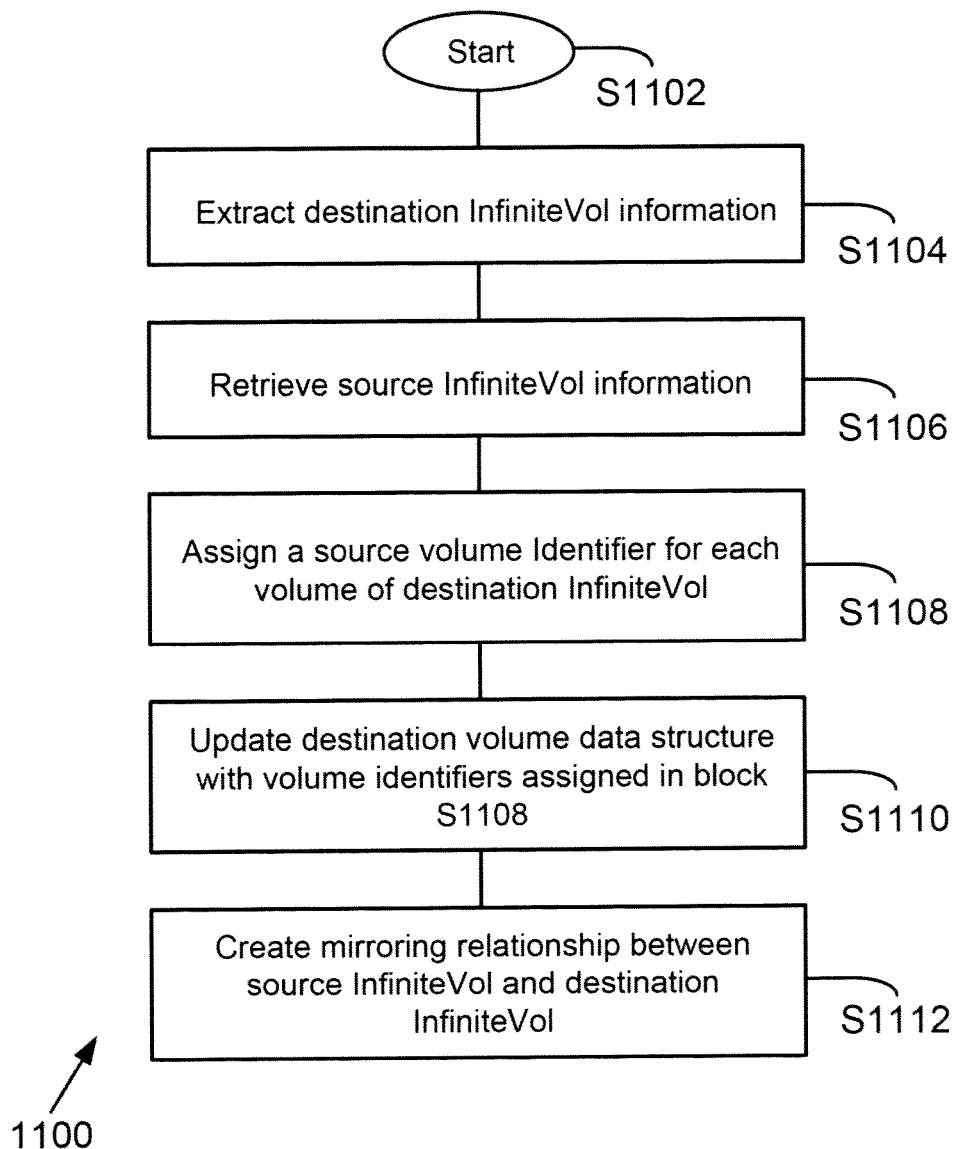
FIGS. 11A, 12A-12B and 13 show process flow diagrams, according to the adaptive embodiments of this disclosure.

FIG. 11A shows a process 1100 for creating mirroring relationships between namespace 1004, OLS store 1006 and data constituent volumes 1008A-1008N of the source InfiniteVol 1001 with namespace 1014, OLS store 1016 and data constituent volumes 1018A-1018N of the InfiniteVol 1003 at the remote location 1010, according to one embodiment. The process begins in block S1102 and in block S1104 mirroring coordinator 1024 obtains a list of volumes that are available within destination InfiniteVol 1003. This information may be obtained from the destination volume data structure 1028 that is similar to data structure 708 described above with respect to FIG. 7B. The list of volumes includes volume identifiers for all the volumes that may be included within InfiniteVol 1003.

In block S1106, mirroring coordinator 1024 obtains a list of volumes for the source InfiniteVol 1001. This information may be obtained by source proxy module 1030 from the M-Module 218 of primary cluster 1007 managing the source volume data structure (for example, 708).

In block S1108, mirroring coordinator 1024 assigns the source volume identifiers for the volumes of InfiniteVol 1001 to each corresponding volume of the destination InfiniteVol 1003. Mirroring coordinator 1024 maps the source volume identifiers for each volume of InfiniteVol 1001 to each volume of InfiniteVol 1003. The mapped volume identifiers may be stored as part of destination volume data structure 1028 or otherwise.

In block S1110, mirroring coordinator 1024 updates the destination volume data structure 1028 with the newly assigned source InfiniteVol 1001 identifiers. In one embodiment, the original volume identifiers of each volume within destination InfiniteVol 1003 are mapped to volume identifiers of the source InfiniteVol 1001. The mapping information may be maintained as a subset of destination volume data structure 1028.

In block S1112, a mirroring relationship is created between each volume of source InfiniteVol 1001 and each volume of the destination InfiniteVol 1003. The relationship may be maintained at mirroring data structure 1026 having Fields 1026A-1026H that are described below in detail with respect to FIG. 11B. It is noteworthy that instead of storing the mirroring relationships in mirroring data structure 1026, the relationships may be maintained at the destination volume data structure 1028. The mirroring relationship enables transfer of information from each volume of the primary location 1000 to the remote location 1010.

Figure 11B:
FIG. 11B shows an example of a data structure used for replicating a point in time copy at a remote location, according to one embodiment.

Referring to FIG. 11B, field 1026A of data structure 1026 includes a destination cluster identifier that is used to uniquely identify the destination cluster 1009 at the remote location 1010.

Field 1026B identifies the destination InfiniteVol 1003, while field 1026C identifies the destination storage repository that includes the InfiniteVol 1003. The vserver managing the InfiniteVol 1003 may be identified by field 1026D.

Field 1026E includes a source cluster identifier that is used to uniquely identify the primary cluster 1007 at the primary location 1000.

Field 1026F identifies the source InfiniteVol 1001, while field 1026G identifies the source storage repository that includes the source InfiniteVol 1001. The vserver managing the InfiniteVol 1001 is identified by field 1026H.

Field 1026I identifies the relationship between the source InfiniteVol 1001 and destination InfiniteVol 1003 as a mirroring relationship. The snapshots of source InfiniteVol 1001 are replicated based on the configuration details 1026J that may be customized based on user preferences. The configuration details 1026J may specify how often the snapshots at the primary location are mirrored at the remote location 1010; access control information that limits access to the snapshots to authorized users and any other details. Once the mirroring relationships are generated, a replicated copy of the InfiniteVol 1001 is transferred to remote location 1010, as described below in more detail.

Figure 12A:
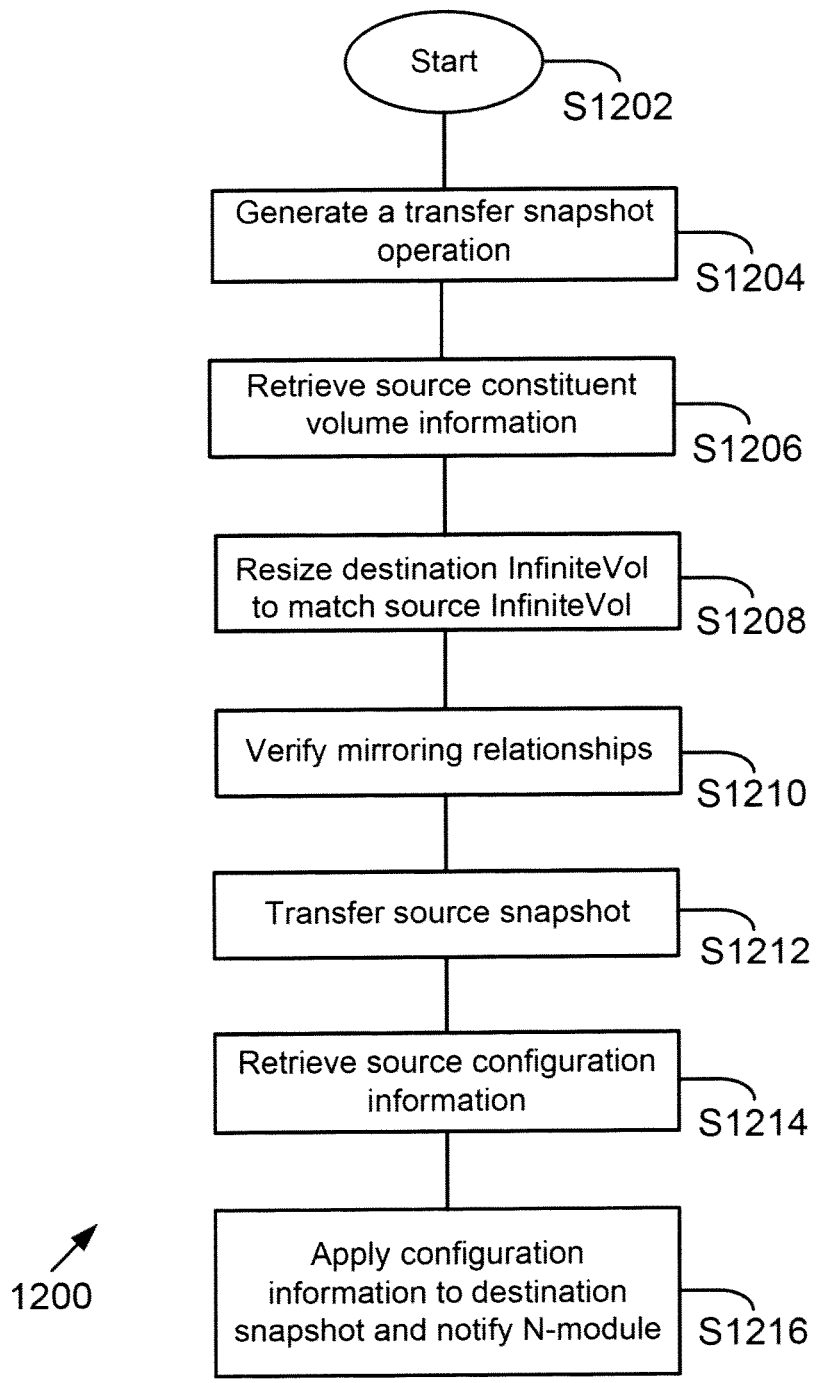

FIG. 12A shows a process 1200 for generating a replicated copy of InfiniteVol 1001 at remote location 1010 for disaster recovery, according to one embodiment. The process 1200 begins in block S1202 and in block S1204, a transfer snapshot operation is created at the primary location 1000 to take a snapshot of InfiniteVol 1001 and then transfer the snapshot to the remote location 1010. The transfer snapshot operation may be used to generate a base snapshot (for example, 1012) or provide updates to an existing replicated copy at the remote location 1010.

In block S1206, mirroring coordinator 1024 retrieves source volume information, for example, information provided by fields 1026E-1026H described above with respect to FIG. 11B. The source InfiniteVol 1001 information may be obtained from the primary cluster 1007 managing InfiniteVol 1001. The information may be received by source proxy module 1030 and then provided to mirroring coordinator 1024.

In block S1208, the destination InfiniteVol 1003 may be resized to match the source InfiniteVol 1001. Based on the information collected in block S1206, mirroring coordinator 1024 compares the source volume information with destination volume information stored at destination volume data structure 1028. Based on the comparison, mirroring coordinator 1024 determines if new volumes were added to the destination InfiniteVol 1003 prior to block S1206. If new volumes were added, then volume identifiers for the newly created destination volumes are replaced by source volume identifiers, as described above in block S1110 of FIG. 11A. Mirroring relationships are also generated for the new volumes.

In block S1210, the mirroring relationship between the source 1001 and destination 1002 are confirmed by mirroring coordinator 1024 by checking data structure 1026 (or 1028). If a relationship does not exist, for example, for any new volumes, then mirroring relationships are generated as described above with respect to FIG. 11A.

In block S1212, the source snapshot S1 1002A (or an update) is transferred to the remote location 1010 using the block replication protocol 1005. Thereafter, configuration information regarding Snapshot1 1002A is retrieved in block S1214. The configuration information may include a vserver identifier that identifies a vserver (for example, 608, FIG. 6) that presents InfiniteVol 1001; identifier that identifies the InfiniteVol 1001; a snapshot identifier that identifies the snapshot 1002A; a volume count that provides a count of volumes included within InfiniteVol 1001; a snapshot name; identity of clients that are allowed to access the snapshot 1002A; an indicator indicating if the snapshot 1002A is valid or invalid; a list of all the volumes, i.e. namespace, OLS store and data constituent volumes that are included within the snapshot 1002A; a timestamp indicating when the snapshot 1002A was generated and any other configuration information.

In block S1216, the configuration information is replicated and the snapshot data structure 1034 is updated. The N-module 214 is also notified by the snapshot coordinator 1032 so that it can update cache 714 and can redirect any requests for the transferred snapshots, similar to the redirection described above with respect to FIG. 9B. This enables the N-module 214 to redirect client requests from the active file system that may point to one snapshot on one volume (that has finished a transfer) and to another snapshot on another volume (that is still in the middle of a transfer) to a consistent snapshot on all volumes, as described below with respect to FIG. 13.

Figure 12B:
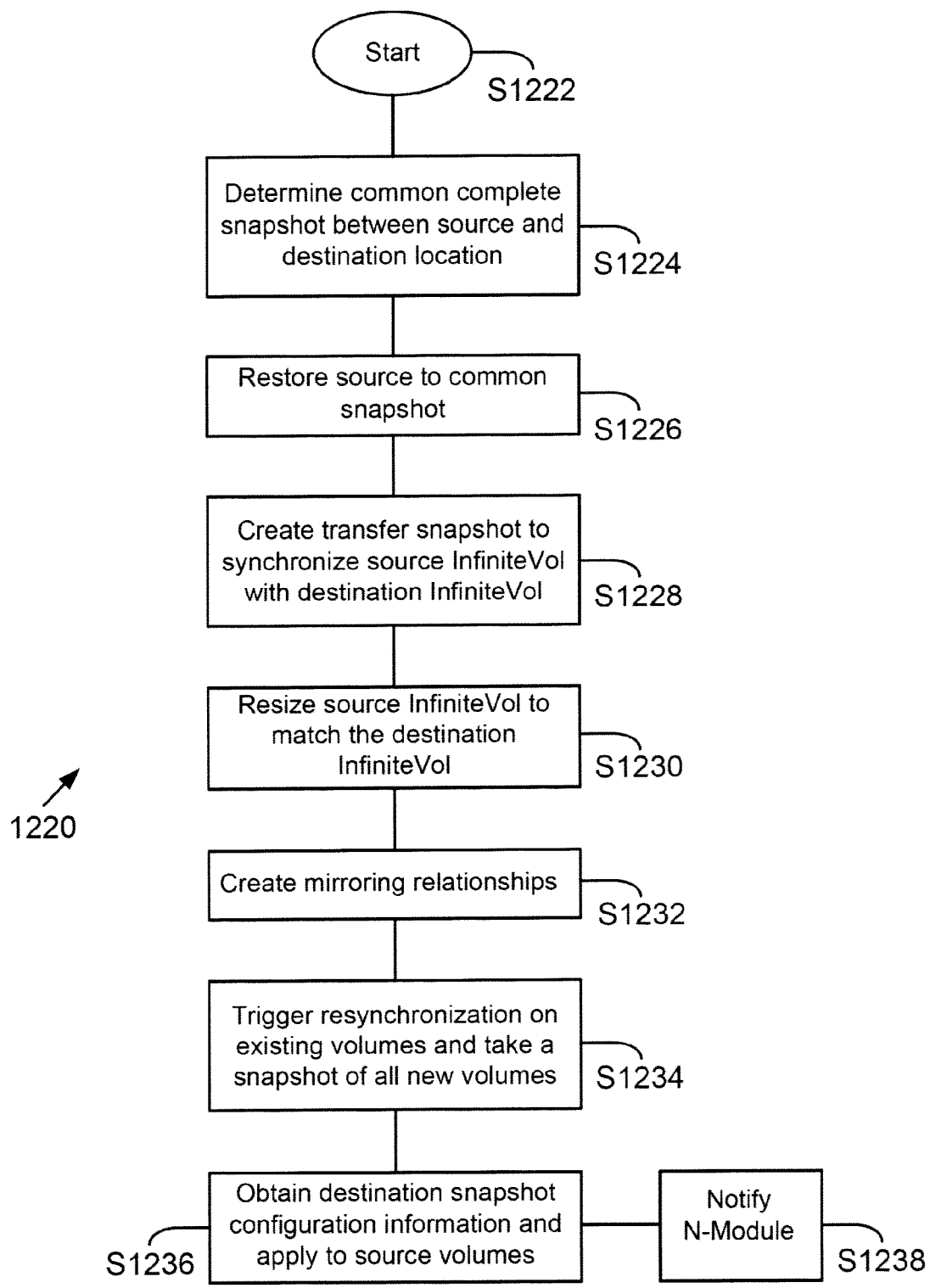

FIG. 12B shows a process 1220 for re-synchronizing the destination InfiniteVol 1003 with the source InfiniteVol 1001 after a break occurred resulting in the primary location 1000 becoming unavailable to a user. The break maybe due to any reason, for example, a disaster, breakdown in network communication or any other reason. After the break (e.g., the receipt of a failure notice in response to a request to access data on the primary location 1000), the request is redirected to the destination InfiniteVol 1003. Once connection to the primary location 1000 is restored, a resynchronization operation is performed before the user is again provided access to the source InfiniteVol 1001 at the primary location 1000.

The process starts in block S1222. In block S1224, a common snapshot between the primary location 1000 and the remote location is first determined. This may be determined from the snapshot data structure 1034 that stores information regarding the various snapshots of InfiniteVol 1003. In block 51226, the source InfiniteVol 1001 is restored to the common snapshot.

In block S1228, a transfer snapshot request is created. The destination InfiniteVol 1003 now becomes the source and the InfiniteVol 1001 at the primary location now becomes the destination for the snapshot transfer operation.

The process steps S1230-S1236 are similar to the process steps S1208-S1216 of FIG. 12A, except the InfiniteVol 1003 operates as the source and the InfiniteVol 1001 operates as a destination volume. The mirroring relationships are also reversed (S1232) so that correct volume pairs are used but in the opposite direction. For example, before a disaster, the snapshot 1008A may point to snapshot 1018A, but in block S1232, snapshot 1018A points to snapshot 1008A.

In block S1238, the N-module 214 managing the source InfiniteVol 1001 is notified of the re-synchronization by snapshot coordinator 1032. This enables the N-module 214 to redirect client requests from the active file system that may point to one snapshot on one volume (that has finished a transfer) and to another snapshot on another volume (that is still in the middle of a transfer) to a consistent snapshot on all volumes, as described below with respect to FIG. 13.

Figure 13:
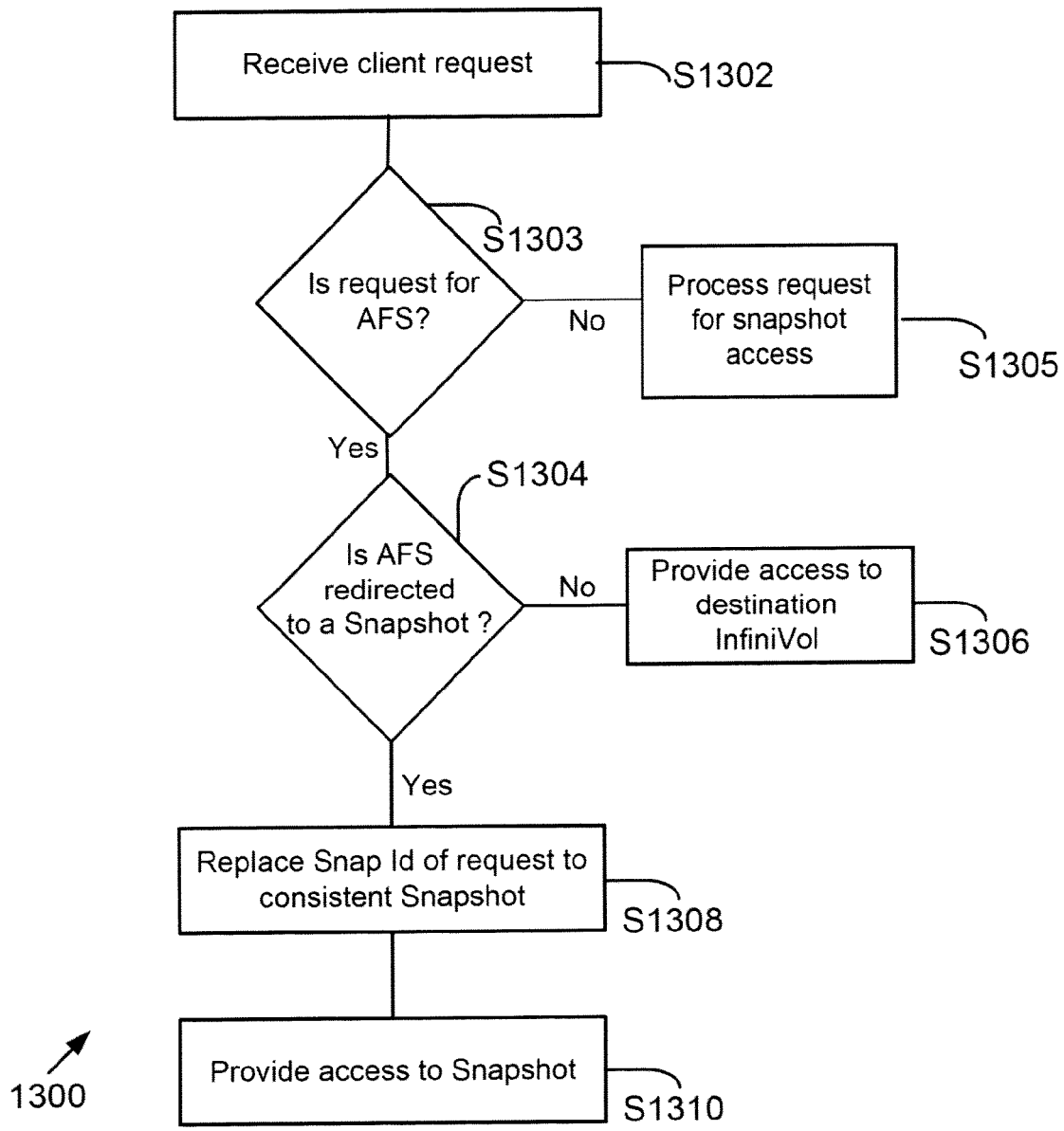

FIG. 13 shows a process 1300 for providing access to the destination InfiniteVol 1003, according to one embodiment. The process begins, in block S1302, when a request to access a snapshot is received. The request is typically received by N-Module 214. The request may include a handle with a snapshot identifier for the snapshot of the namespace and a namespace identifier, as described above with respect to FIG. 9B.

In block S1303, the process first determines if the request is for the active file system. This is determined by namespace 506 by evaluating the namespace handle. If a specific value identifying the active file system value is specified in the handle, (for example, 0) (See 908, FIG. 9B), then the request is considered to be for the active file system. If the request is not for the active file system, then the process moves to block S1305, where access to the requested snapshot is processed, as described above with respect to FIG. 9A.

If the request is for the active file system, then in block S1304, the process determines if the active file system is redirected to a snapshot. This is determined by checking cache 714 of N-module 214 that maintains an entry indicating if the active file system is redirected to a snapshot. If the active file system is not directed to a snapshot then in block S1306, the user is provided access to the active file system of the destination InfiniteVol.

If the active file system is redirected to a snapshot, then in block S1308, the snapshot identifier of the request (see 908, FIG. 9B) is replaced by a snapshot identifier that was successfully transferred. The snapshot identifier is obtained from cache 714, which is based on the snapshot data structure 710 (or 1034) described above with respect to FIG. 7D. Thereafter, in block S1310, the client is provided access to the snapshot.

In one embodiment, a recovery copy of the source InfiniteVol is generated at the remote location and made available to a user, for example, if disaster occurs. The user is able to access a consistent replicated copy with very little disruption.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc. Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Thus, a method and system for taking snapshots of an InfiniteVol and maintaining a disaster recovery copy have been described. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:

creating a snapshot of each component of a source expandable storage volume that increases and decreases in size based on usage by initiating a logical fence for a namespace volume, an object location system (OLS) data store and then for a plurality of data constituent storage volumes of the source expandable storage volume and removing the logical fence in a reverse order after the snapshot is taken; wherein the namespace volume is for storing information to access data containers using a directory path address, the OLS data store is used to retrieve data containers using a location identifier and an object identifier without having to use the directory path address of the namespace volume and the plurality of data constituent volumes are used for storing data containers; and wherein the logical fence prevents any read and write requests in the snapshot of the expandable storage volume generated after the logical fence is initiated;

generating a transfer operation for transferring the snapshot of each component of the source expandable storage volume from a first location to a second location;

retrieving information regarding the source expandable storage volume from the first location;

resizing the destination expandable storage volume at the second location to match components of the source expandable storage volume at the first location;

transferring the snapshot of each component of the source expandable storage volume from the first location to the second location;

copying configuration information regarding the snapshots from the first location to the second location; and updating a data structure for storing information regarding the transferred snapshot of the expandable storage volume, where the data structure enables presenting snapshots of each of the components of the source expandable storage volume as a single logical object, while each individual snapshot is also accessible as an individual logical entity.

2. The method of claim 1, wherein the expandable storage volume with the plurality of data constituent volumes is managed by at least two different storage system nodes.

3. The method of claim 1, wherein the namespace volume stores a directory namespace having a directory entry associated with a data object stored at one of the data constituent volumes.

4. The method of claim 3, wherein the directory namespace is a network attached storage (NAS) path namespace of a storage system.

5. The method of claim 4, wherein the directory entry stores a pointer to a redirector file that includes an object locator of the data object.

6. The method of claim 1, further comprising:

presenting the transferred snapshot of the source expandable storage volume as a disaster recovery copy from the second location for reading and writing information; and resizing the source expandable storage volume at the first location to match the destination expandable storage volume at the second location.

7. The method of claim 6, further comprising:

re-synchronizing the source expandable storage volume with the destination storage volume after the first location becomes available and the disaster recovery copy is no longer used.

8. The machine implemented method of claim 1, further comprising:

establishing a mirroring relationship between components of the source expandable storage volume at the first location with components of the destination expandable storage volume, where the mirroring relationship enables replication of the components of the source expandable storage volume that increases and decreases in size based on usage.

9. A non-transitory, machine readable storage medium having stored thereon instructions for performing a method, comprising machine executable code which when executed by at least one machine, causes the machine to:

create a snapshot of each component of a source expandable storage volume that increases and decreases in size based on usage by initiating a logical fence for a namespace volume, an object location system (OLS) data store and then for a plurality of data constituent storage volumes of the source expandable storage volume and removing the logical fence in a reverse order after the snapshot is taken; wherein the namespace volume is for storing information to access data containers using a directory path address, the OLS data store is used to retrieve data containers using a location identifier and an object identifier without having to use the directory path address of the namespace volume and the plurality of data constituent volumes are used for storing data containers; and wherein the logical fence prevents any read and write requests in the snapshot of the expandable storage volume generated after the logical fence is initiated;

generate a transfer operation for transferring the snapshot of each component of the source expandable storage volume from a first location to a second location;

retrieve information regarding the source expandable storage volume from the first location;

resize the destination expandable storage volume at the second location to match components of the source expandable storage volume at the first location;

transfer the snapshot of each component of the source expandable storage volume from the first location to the second location;

copy configuration information regarding the snapshots from the first location to the second location; and update a data structure for storing information regarding the transferred snapshot of the expandable storage volume, where the data structure enables presenting snapshots of each of the components of the source expandable storage volume as a single logical object, while each individual snapshot is also accessible as an individual logical entity.

10. The storage medium of claim 9, wherein the expandable storage volume with the plurality of data constituent volumes is managed by at least two different storage system nodes.

11. The storage medium of claim 9, wherein the namespace volume stores a directory namespace having a directory entry associated with a data object stored at one of the data constituent volumes.

12. The storage medium of claim 11, wherein the directory namespace is a network attached storage (NAS) path namespace of a storage system.

13. The storage medium of claim 12, wherein the directory entry stores a pointer to a redirector file that includes an object locator of the data object.

14. The storage medium of claim 9, the machine executable code further causes the machine to:

present the transferred snapshot of the source expandable storage volume as a disaster recovery copy from the second location for reading and writing information; and resize the source expandable storage volume at the first location to match the destination expandable storage volume at the second location.

15. The storage medium of claim 13, the machine executable code further causes the machine to:

re-synchronize the source expandable storage volume with the destination storage volume after the first location becomes available and the disaster recovery copy is no longer used.

16. A system, comprising:

a memory with machine readable medium comprising machine executable code having stored thereon instructions; and a processor module coupled to the memory configured to execute the machine executable code to:

create a snapshot of each component of a source expandable storage volume that increases and decreases in size based on usage by initiating a logical fence for a namespace volume, an object location system (OLS) data store and then for a plurality of data constituent storage volumes of the source expandable storage volume and removing the logical fence in a reverse order after the snapshot is taken; wherein the namespace volume is for storing information to access data containers using a directory path address, the OLS data store is used to retrieve data containers using a location identifier and an object identifier without having to use the directory path address of the namespace volume and the plurality of data constituent volumes are used for storing data containers; and wherein the logical fence prevents any read and write requests in the snapshot of the expandable storage volume generated after the logical fence is initiated;

generate a transfer operation for transferring the snapshot of each component of the source expandable storage volume from a first location to a second location;

retrieve information regarding the source expandable storage volume from the first location;

resize the destination expandable storage volume at the second location to match components of the source expandable storage volume at the first location;

transfer the snapshot of each component of the source expandable storage volume from the first location to the second location;

copy configuration information regarding the snapshots from the first location to the second location; and update a data structure for storing information regarding the transferred snapshot of the expandable storage volume, where the data structure enables presenting snapshots of each of the components of the source expandable storage volume as a single logical object, while each individual snapshot is also accessible as an individual logical entity.

17. The system of claim 16, wherein the expandable storage volume with the plurality of data constituent volumes is managed by at least two different storage system nodes.

18. The system of claim 16, wherein the namespace volume stores a directory namespace having a directory entry associated with a data object stored at one of the data constituent volumes.

19. The system of claim 16, where the machine executable code further causes the machine to:

present the transferred snapshot of the source expandable storage volume as a disaster recovery copy from the second location for reading and writing information;

resize the source expandable storage volume at the first location to match the destination expandable storage volume at the second location; and re-synchronize the source expandable storage volume with the destination storage volume after the first location becomes available and the disaster recovery copy is no longer used.

20. The system of claim 16, where the machine executable code further causes the machine to:

establish a mirroring relationship between components of the source expandable storage volume at the first location with components of the destination expandable storage volume, where the mirroring relationship enables replication of the components of the source expandable storage volume that increases and decreases in size based on usage.

* * * * *